(12) United States Patent
Hino

(10) Patent No.: US 6,172,976 B1
(45) Date of Patent: Jan. 9, 2001

(54) TELECOMMUNICATIONS SERVICE CONTROL UNIT AND METHOD OF CONTROLLING THEREOF

(75) Inventor: Koji Hino, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/031,704

(22) Filed: Feb. 27, 1998

(30) Foreign Application Priority Data

Feb. 28, 1997 (JP) .................................................... 9-062093

(51) Int. Cl.[7] .................................................. H04L 12/50
(52) U.S. Cl. .......................................... 370/360; 370/259
(58) Field of Search .................................... 370/259, 360, 370/363, 368, 371, 374, 378, 383, 381

(56) References Cited

U.S. PATENT DOCUMENTS

| | | | |
|---|---|---|---|
| 5,377,186 | * 12/1994 | Wegner et al. | 370/259 |
| 5,623,488 | * 4/1997 | Svennevik et al. | 370/360 |
| 5,768,262 | * 6/1998 | Hallock et al. | 370/259 |
| 5,926,464 | * 7/1999 | Fraser | 370/259 |
| 5,982,769 | * 11/1999 | Bond et al. | 370/360 |

FOREIGN PATENT DOCUMENTS

| | | |
|---|---|---|
| 62-216568 | 9/1987 | (JP) . |
| 64-50694 | 2/1989 | (JP) . |
| 64-82886 | 3/1989 | (JP) . |
| 2-294194 | 12/1990 | (JP) . |
| 4-68749 | 3/1992 | (JP) . |
| 4-119097 | 4/1992 | (JP) . |
| 4-346549 | 12/1992 | (JP) . |
| 5-14946 | 1/1993 | (JP) . |
| 5-336110 | 12/1993 | (JP) . |
| 6-6466 | 1/1994 | (JP) . |
| 6-339169 | 12/1994 | (JP) . |
| 7-59132 | 3/1995 | (JP) . |
| 7-87536 | 3/1995 | (JP) . |
| 7-177542 | 7/1995 | (JP) . |
| 8-314711 | 11/1996 | (JP) . |
| 9-18906 | 1/1997 | (JP) . |

* cited by examiner

Primary Examiner—Salvatore Cangialosi
(74) Attorney, Agent, or Firm—Foley & Lardner

(57) ABSTRACT

A telecommunications service control unit within which a plurality of controllers classified for service items are included makes quite easy to add a new telecommunications device under the same service control unit. Each control procedure of a controller corresponding to respective telecommunications device is standardized and also encoded as a result of classification of standardized procedure. Designating another code for calling out controller corresponding to the control procedure code, a conversion table between control procedure codes and call out code is provided for service control interface of corresponding classified service item. Service control controller which instructs all classified controllers applies the procedure codes to instruct corresponding service control interface and the instructed service control interfaces apply the call out code for call out the instructed specific controller. Accordingly, addition of new telecommunications device requires only to arrange controller for the new device and to modify the contents of the conversion table at the corresponding service control interfaces.

10 Claims, 8 Drawing Sheets

TELECOMMUNICATIONS SERVICE CONTROL UNIT AND METHOD OF CONTROLLING THEREOF

BACKGROUND OF THE INVENTION

1. Field of the Invention

The present invention relates to a telecommunications service control unit within a telecommunications switching network and method of operation of the telecommunications service control unit, and more particularly, to controlling a call processing between a call originating terminal and called terminal including switching operations.

2. Description of the Related Art

The conventional service control unit of this type described above uses a plurality of specific controls corresponding to user's requests, in addition to effecting the operation of a standard communication control system prepared in advance, as described in Japanese Patent Application Laid-Open No. 216568/87.

FIG. 1 is a block diagram illustrating an example of a conventional telecommunication service system configuration.

Service controller 801 is provided for corresponding to every connection services, contains a descriptive operating procedure, calls service common management/control means 821 for implementation and controls a requested telecommunications service, and as service control unit 101, controls service implementation device 251 thereby to implement the communication service according to the instruction of the service controller 801.

Service common management/controller 821 has a data library for control procedures necessary for all telecommunications services, from which the procedures of implementing a requested service are called out by service controller 801, the procedures are referred to control such telecommunications apparatus as subscriber circuit controller 211 and switching controller 221; and the control procedures are executed through implementation device 251 upon called from service control means 801.

Terminals 241 and 242 connected to each other via subscriber circuit controller 211, switching controller 221 and subscriber circuit controller 212. A service implementation processing involved in this connection, is executed by service control unit 101 which drives service controller 801 and service common management/controller 821, so that subscriber circuit controller 211, switching controller 221, media controller 231 and subscriber circuit controller 212 are controlled through apparatus control interface 261.

In executing this processing, service implementation device 251 is controlled by service controller 801 which applies service control-use memory 811 as a storage, causing each terminal controller to implement a requested service via service common management/controller 821 which applies service common management/controller-use memory 831 as a storage.

It is noted here that media controller 231 is a voice storage and/or a voice synthesizer unit, etc.

Next, referring to FIG. 1, this conventional technique is described in accordance with its functional aspect.

Terminal 241 requests service control unit 101 for a service through subscriber circuit controller 211. In response to this request, service control unit 101 judges the service required, selecting the control procedure corresponding to the requested service through service controller 801, and instructing service implementation device 251 to execute the control procedure selected by service controller 801.

Service controller 801 is defined to call service common management/controller 821 which holds feasible processing procedures as the library within service control unit 101 and implementation device 251 undertakes a service implementation processing, under the control of service controller 801.

The information, which is temporarily required during the operation of service controller 801 is written into and read out from service controller-use memory 811 according to the procedure built-in service controller 801.

Service common management/controller 821 starts functioning in response to a call from service controller 801.

Service common management/controller 821 has calling procedures to call each of such functions of subscriber circuit controller 211, media controller 231, switching controller 221, subscriber circuit controller 212, etc. which are driveable by service control unit 101 and in response to a request from service controller 801, operates such telecommunications apparatus as subscriber circuit controller 211, and so forth, via apparatus control interface 261.

The information, which is temporarily required while service common management/controller 821 is proceeding with its processing, is stored into and read out from service common management/control-use memory 831, following the procedure contained in service common management/control means 821.

FIG. 2 is a block diagram illustrating one example of the conventional telecommunications service control system, wherein the principle of the invention disclosed in above Japanese Patent Application Laid-Open Publication No. 216568/87 is described. In the conventional telecommunications control system disclosed in the Japanese Patent Application Laid-Open Publication, controller (CC) 911 controls switching/connection-use communication path 901 according to a given procedure.

Logic node 922 includes therein data 951 related to service users, processing procedure 961, etc. for satisfying a service user request. A detail of internal configuration 931 of node 922 is denoted in FIG. 2.

Next, referring to FIG. 2, the conventional communication service control system is described with regard to its functioning. User A sends out a request a call with B to controller 911 through communication path 901. Controller 911 starts node 921 corresponding to user A and then transfers an incoming call information to node 922 corresponding to user B.

Node 922 keeps information 931 concerning user B, as shown in the figure, and executes a judgment whether the incoming call is accepted or transferred to elsewhere.

The result of the judgment at node 922 is reported to controller 911, and following this reported information, controller 911 controls communication path 901 for a connection processing.

However, the conventional technique confronts with the problems which will be referred to hereunder:

The first problem lies in that to enable controlling a newly added communication apparatus from service control unit 101, it is needed to modify, over a great extent, the operational contents stored in the service common management/controller.

The reason thereof is that in the conventional service control unit 101, respective telecommunications apparatus operating procedures are integrally contained in the service common management/controller in wholly configuration thereto, thus not allowing to renew the telecommunications apparatus operating procedures alone.

The second problem consists in that when a service controller and service common management/controller defined to operate within a service control unit are forced to implement across a plurality of service control unit, it is necessary to greatly modify the operational contents included in the service common management/controller.

The reason thereof is that to implement a service which needs to operate across a plurality of service control units, it is required to simultaneously control the telecommunications devices associated with this service from plural service controllers, because in spite of the requirement that an arbitration processing must be undertaken among service control units, for each telecommunications apparatus in a manner that respective controls of individual communication apparatus may not conflict with one another, as pointed out regarding the reason of the first problem, the communication apparatus operating procedures are stored in the service common management/controller, resulting in necessity to contain a required arbitration processing procedure in the service common management/controller.

SUMMARY OF THE INVENTION

It is therefore an object of the present invention, which is achieved in consideration of the problems described above, to provide a service controller and a service control system allowing to reduce the amount of rewriting the operational contents of a control means, which rewriting becomes necessary not only for commissioning of new telecommunications apparatus with a service controller but also for adaptability thereof to the configuration of a different service controller.

In a telecommunications service control system configured to implement a telecommunications service through the control of a telecommunications apparatus, the service control unit of the present invention to achieve said object comprises control means for controlling telecommunications apparatus and software respectively, control-use memories which are used by the respective control means as a temporary storage, a control interface means for converting from call code representing a standardized control procedure to another code designating a corresponding controller, a service control means so programmed previously to utilize the control interface means for calling requested controller, a service control-use memory which the service control means applies as a temporary storage, and a service implementation device to actuate each of means described above.

Further, the present invention provides a control means, corresponding to one terminal, which comprises a control means for an actual terminal such as an originating call, a control means for a virtual terminal which is to be defined by connection environmental conditions, control-use memories corresponding to the control means respectively for the actual and virtual terminal, and control interfaces respectively for said actual and virtual terminal.

Further, the present invention has a service control library which stores all necessary standardized control procedures with respective represented codes classified for each control stage, a service control library-use memory which the service control library applies as a temporary storage, and owns a configuration, wherein the service control means calls the service control library while the service control library calls a group of said control interface means.

The present invention not only makes feasible a plurality of said telecommunications service control units to communicate with each other via an inter-telecommunications service control units path but also enables to implement telecommunications service across said plurality of telecommunications service control units.

Outlining the present invention, it is summarized that in the present invention, telecommunications service control is effected according to the control procedures included in a service controller. More precisely, service implementation device 251 illustrated in FIG. 3 implements a communication service, following the control procedures stored in service controller 111 in FIG. 3. The service controller has a service implementation procedure stored therein previously, which is put into practice, using each of respective control interfaces 271, 272, 273, 274 and 275, each holds the interface to standardized procedure for each of respective telecommunications apparatus and a software means, subscriber circuit controllers 211 and 212, switching controller 221, media controller 231 and address resolution controller 151.

These control interfaces are each provided with a table of correspondence between the standardized control procedure for each communication apparatus, and the mode of calling by code which represents each of the control procedures respectively of controllers 121, 122, 131, 141, and 151 corresponding to respective telecommunications apparatus. The controller corresponding to each of respective communication apparatus has a function to control actual communication apparatus 211, 212, 221, 231, 241 and 242.

Service implementation device 251 transmits an instruction code representing requested control procedures operating instruction to a control interface according to the instruction of service controller 111. Using a table of correspondence held with, the control interface converts a received instruction into a mode of calling a control means which control the corresponding actual telecommunications apparatus, executing the calling. Upon receiving a call, the control means actuate controlling of corresponding apparatus according to the contents of the instruction.

In the present invention, in case where the service control unit adds a new telecommunications apparatus under the same service control means, a new control means and a new control interface corresponding to the new telecommunications apparatus are provided; the service implementation device transmits the same operating code instruction as described above to the new control interface; and upon receiving the operating code instruction, the new control interface converts said operating code instruction into the mode of calling said new control means, subsequently executing the mode of calling. In response to a received call, the new control means actuate controlling of the corresponding apparatus.

DESCRIPTION OF THE PREFERRED EMBODIMENTS

Figure 1:
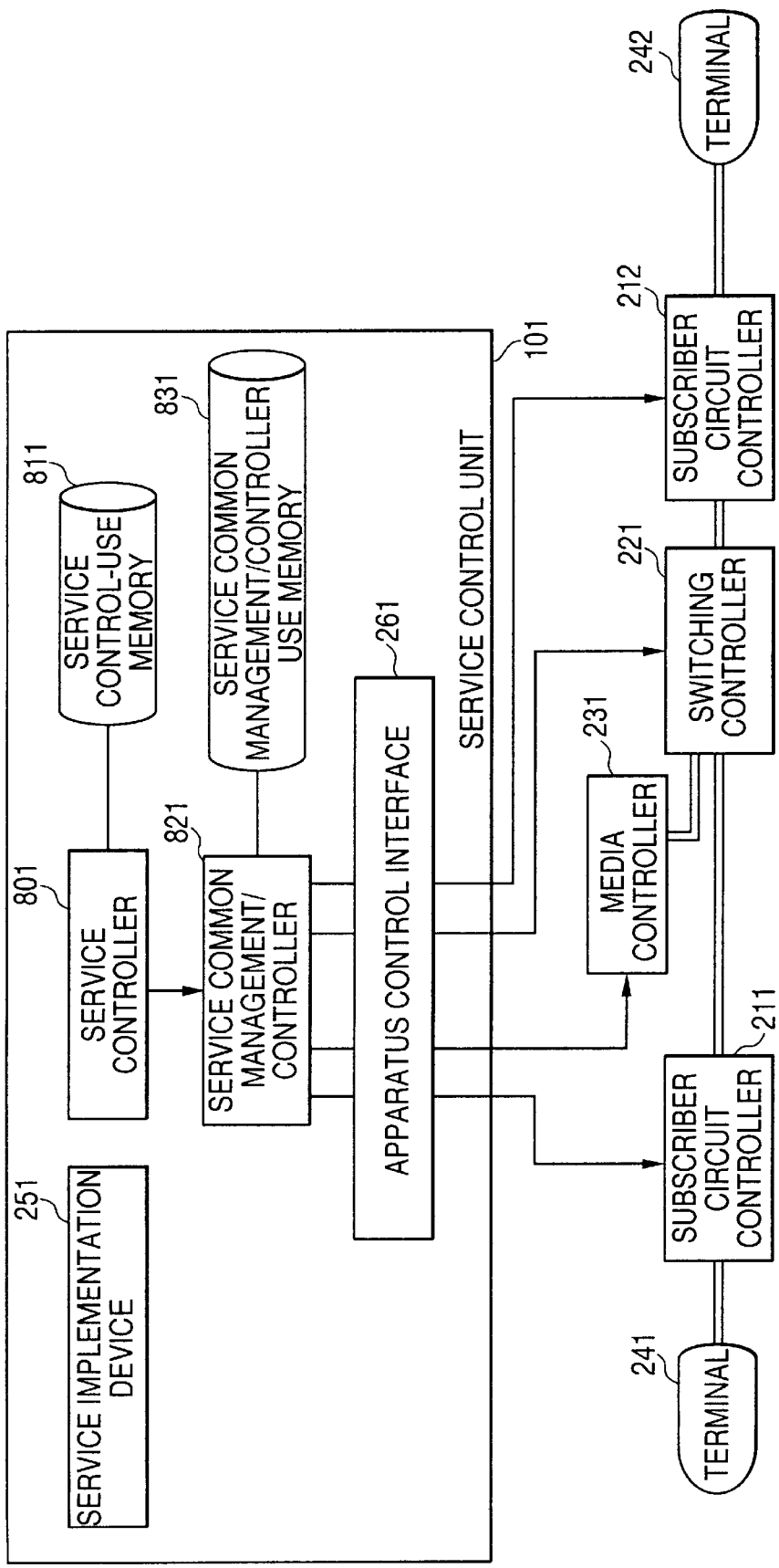
FIG. 1 is a block diagram illustrating the configuration of a conventional system.

Referring to the drawings, each embodiment of the present invention is described in detail.

Figure 3:
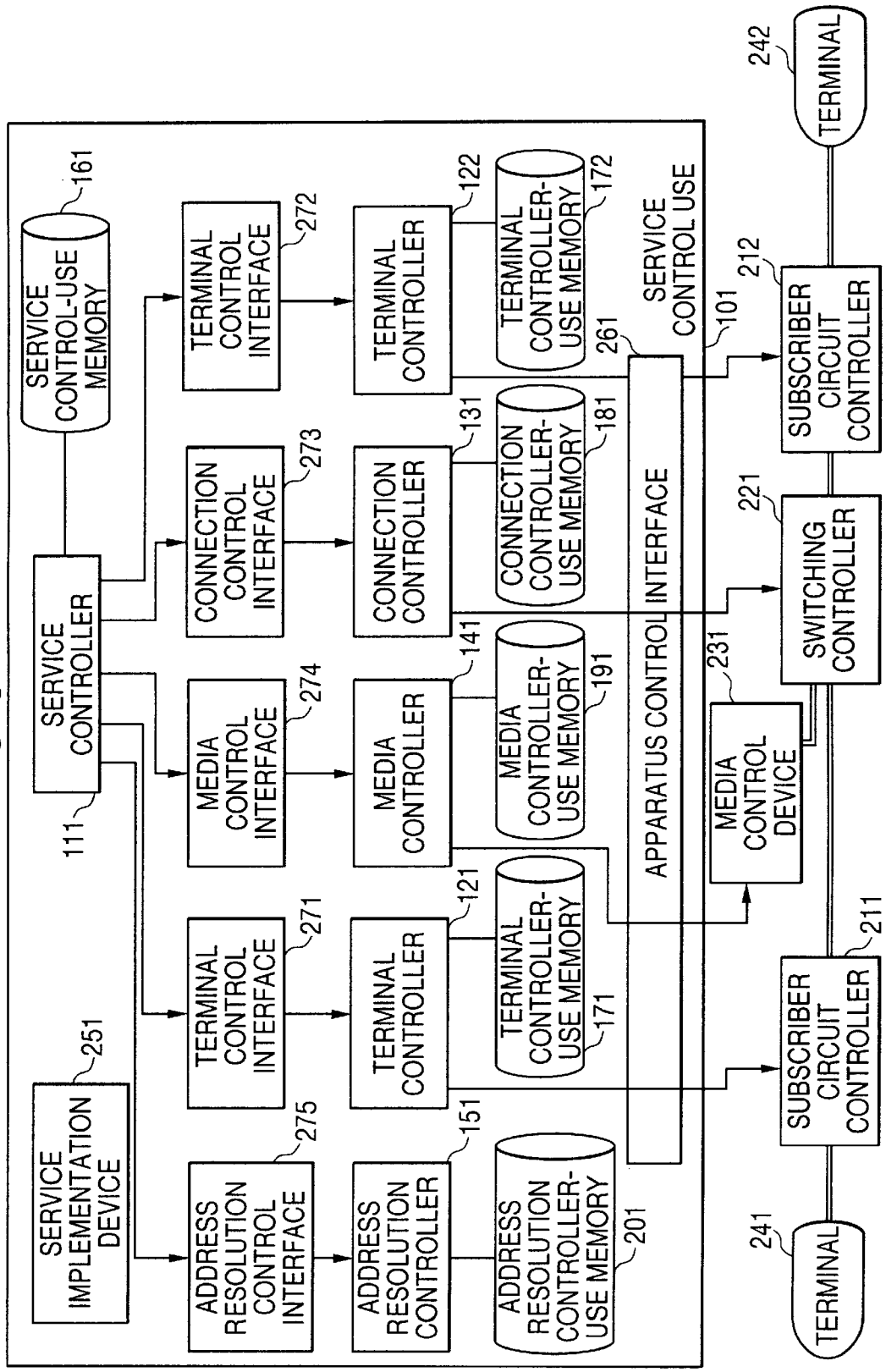
FIG. 3 is a block diagram illustrating a functional configuration and an operating environment of the first embodiment according to the present invention.

FIG. 3 is a block diagram illustrating the configuration of the first embodiment according to the present invention. Referring to FIG. 3, the first embodiment of the present invention comprises program-controlled service control unit 101, terminals 241 and 242—the parties concerned in communication, subscriber circuit controller 211 for coupling these terminals with each other, switching controller 221, subscriber circuit controller 212, and media control unit 231 for transforming the contents of communication from one to another, or elsewhere.

Service control unit 101 comprises service implementation device 251 to implement communication services, apparatus control interface 261 controlling signal exchange between service control unit 101 and a telecommunications apparatus such as subscriber circuit controller 211, etc., service control-use memory 161 serviceable as a temporary storage when service controller 111 operates, terminal control-use memory 171 serviceable as a temporary storage when terminal controller 121 is actuated, terminal control-use memory 172 serviceable as a temporary storage when terminal controller 122 is actuated, connection control-use memory 181 serviceable as a temporary storage when connection controller 131 is in operation, media control-use memory 191 serviceable as a temporary storage when media controller 141 operates, and address resolution control-use memory 201 serviceable as a temporary storage when address resolution controller 151 operates.

Service implementation device 251 executes corresponding service control, following the control procedure shown by service controller 111, using service control-use memory 161 as a temporary storage.

Service controller 111 has functions as follows:
(a) a function to call terminal controller 121 through terminal control interface 271;
(b) a function to call terminal controller 122 through terminal control interface 272;
(c) a function to call connection controller 131 through connection control interface 273;
(d) a function to call media controller 141 through media control interface 274; and
(e) a function to call address resolution controller 151 through address resolution control interface 275.

Service controller 111 provides necessary control procedures for a requested service, using these functions.

Terminal control interface 271 is caused to correspond to terminal controller 121 and keeps a conversion table between the information required to call respective control procedures selectively which is actually provided in terminal controller 121, and the terminal control procedure discriminating information obtainable as a result of encoding discriminative by classifying a plurality of standardized control procedure groups of different type terminal controllers preliminary.

Further, in case where another controller such as service controller 111, etc. calls the function of terminal controller 121, another controller does not directly call terminal controller 121 but requests to execute a specific control method of terminal controller 121 by showing the discriminating information representing the requesting terminal control procedures to terminal control interface 271 corresponding to terminal controller 121.

Terminal control interface 271, receiving information of discriminating mode of terminal control, decides which control procedure is called from procedures provided in terminal controller 121 by detecting the conversion table held within and calls the decided procedure.

Terminal controller 121 is provided with a function to be called externally the standardized grouped control procedures of subscriber circuit controller 211 and terminal 241 which is controlled by terminal controller 121 through subscriber circuit controller 211, and is controlled by service controller 111 via terminal control interface 271, also controls subscriber circuit controller 211 through apparatus control interface 261, and further controlling terminal 241 by way of subscriber circuit controller 211. Furthermore, terminal controller 121 stores the temporary storage information necessary for the operation thereof in terminal control exclusive-use memory 171.

Terminal control interface 272 is caused to correspond to terminal controller 122 and keeps a conversion table between the information required to call respective control procedures selectively which is actually provided in terminal controller 122, and the terminal control procedure discriminating information obtainable as a result of encoding discriminative by classifying a plurality of standardized control procedure groups of different type terminal controllers preliminary.

Further, in case where another controller such as service controller 111, etc. calls the function of terminal controller 122, another controller does not directly call terminal controller 122 but requests to execute a specific control method of terminal controller 121 by showing the discriminating information representing the requesting terminal control procedures to terminal control interface 272 corresponding to terminal controller 122.

Terminal control interface 272 receives the specific terminal controlling method discriminating information and then, using the table of relation of procedures held therein, decides which procedures of the controlling method actually contained in terminal controller 122 is to be called, then calling the controlling mode concerned.

Terminal controller 122 is provided with a function to be called externally the standardized grouped control procedures of subscriber circuit controller 212 and terminal 242 which is controlled by terminal controller 122 through subscriber circuit controller 212, and is controlled by service controller 111 via terminal control interface 272, also controls subscriber circuit controller 212 through apparatus control interface 261 and further controlling terminal 242 by way of subscriber circuit controller 212. Furthermore, terminal controller 122 stores the temporary storage information necessary for the operation thereof in terminal control exclusive-use memory 172.

Connection control interface 273 is caused to correspond to connection controller 131 and keeps a conversion table between the information required to call respective control procedures selectively which is actually provided in connection controller 131, and the terminal control procedure discriminating information obtainable as a result of encoding discriminative by classifying a plurality of standardized control procedure groups of different type terminal controllers preliminary.

Further, in case where another controller such as service controller 111, etc. calls the function of connection controller 131, another controller does not directly call connection controller 131 but requests to execute a specific control method of connection controller 131 by showing the discriminating information representing the requesting terminal control procedures to connection control interface 273 corresponding to connection controller 131.

Connection control interface 273 receives the specific connection controlling method discriminating information and then, using the table of relation of procedures held therein, decides which procedures of the controlling method actually contained in connection controller 131 is to be called, then calling the controlling mode concerned.

Connection controller 131 is provided with a function to be called externally the standardized grouped control procedures of switching controller 221, and controlled by service controller 111 via terminal control interface 273, also controls switching controller 221 through apparatus control interface 261. Furthermore, connection controller 131 stores necessary data into a connection controller use buffer memory 181.

Media control interface 274 is caused to correspond to media controller 141 and keeps a conversion table between the information required to call control procedures selectively which is actually provided in media controller 141, and the media control procedure discriminating information obtainable as a result of encoding discriminative by classifying a plurality of standardized control procedure groups of different type terminal controllers preliminary.

Further, in case where another controller such as service controller 111, etc. calls the function of media controller 141, another controller does not directly call media controller 141 but requests to execute a specific control method of media controller 141 by showing the discriminating information representing the requesting specific media control procedures to terminal control interface 274 corresponding to media controller 141.

Media control interface 274, receiving information of discriminating mode of media control, decides which control procedure is called from procedures provided in media controller 141 by detecting the conversion table held within and calls the decided procedure.

Media controller 141 is provided with a function to be called externally the standardized grouped control procedures of media control device 231 and is controlled by service controller 111 via media control interface 274, also controls media control device 231 through apparatus control interface 261. Furthermore, media controller 141 stores the temporary storage information necessary for the operation thereof in media control exclusive-use memory 191.

Address resolution control interface 275 is caused to correspond to address resolution controller 151 and keeps a conversion table between the information required to call respective control procedures selectively which is actually provided in address resolution controller 151, and the address resolution control procedure discriminating information obtainable as a result of encoding discriminative by classifying a plurality of standardized control procedure groups of different type address resolution controllers preliminary.

Further, in case where another controller such as service controller 111, etc. calls the function of address resolution controller 151, another controller does not directly call address resolution controller 151 but requests to execute a specific control method of address resolution controller 151 by showing the discriminating information representing the requesting address resolution control procedures to address resolution control interface 275 corresponding to address resolution controller 151.

Address resolution control interface 275, receiving information of discriminating mode of address resolution control, decides which control procedure is called from procedures provided in address resolution controller 151 by detecting the conversion table held within and calls the decided procedure.

Address resolution controller 151 is provided with a function to be called externally the standardized grouped control procedures and is controlled by service controller 111 via address resolution control interface 275, also controls address resolution use memory 201.

Address resolution memory 201 stores previously the terminal logical name and terminal physical number which are necessary for address resolution, so that the memory 201 is referred by other controllers through address resolution controller 151.

Apparatus control interface 261 is a device to provide a operative coupling between service control unit 101 and each of subscriber circuit controller 211, switching controller 221, subscriber circuit controller 212 and media control unit 231 and has a function not only to transfer the contents instructed to a corresponding telecommunications apparatus but also to show the information transferred from each telecommunications apparatus to a corresponding controller in response to each of the instructions received respectively from terminal controller 121, connection controller 131, terminal controller 122 and media controller 141.

Subscriber circuit controller 211 has respective functions, one for monitoring the state of terminal 241 and the communication path which terminal 241 uses, and for informing terminal controller 121 of a state change thereof through apparatus control interface 261, and another for receiving an instruction from terminal controller 121 through apparatus control interface 261 and in response the instruction received, for controlling terminal 241 and the communication paths which terminal 241 uses.

Subscriber circuit controller 212 has respective functions, one for monitoring the state of terminal 242 and the communication path which terminal 242 uses, another one for informing terminal controller 122 of a change of said state through apparatus control interface 261, and another for receiving an instruction from terminal controller 122 through apparatus control interface 261 and in response the instruction received, for controlling terminal 242 and the communication paths which terminals 242 uses.

Switching controller 221 has respective functions, the first for monitoring the states respectively of a group of communication paths connected thereto, the second for informing connection controller 131 about changes of these states through apparatus control interface 261, and the third for receiving an instruction from connection controller 131 through apparatus control interface 261 and in response the instruction received, changing the relation of a coupling among said group of communication paths, and switching among said group of communication paths.

Figure 4:
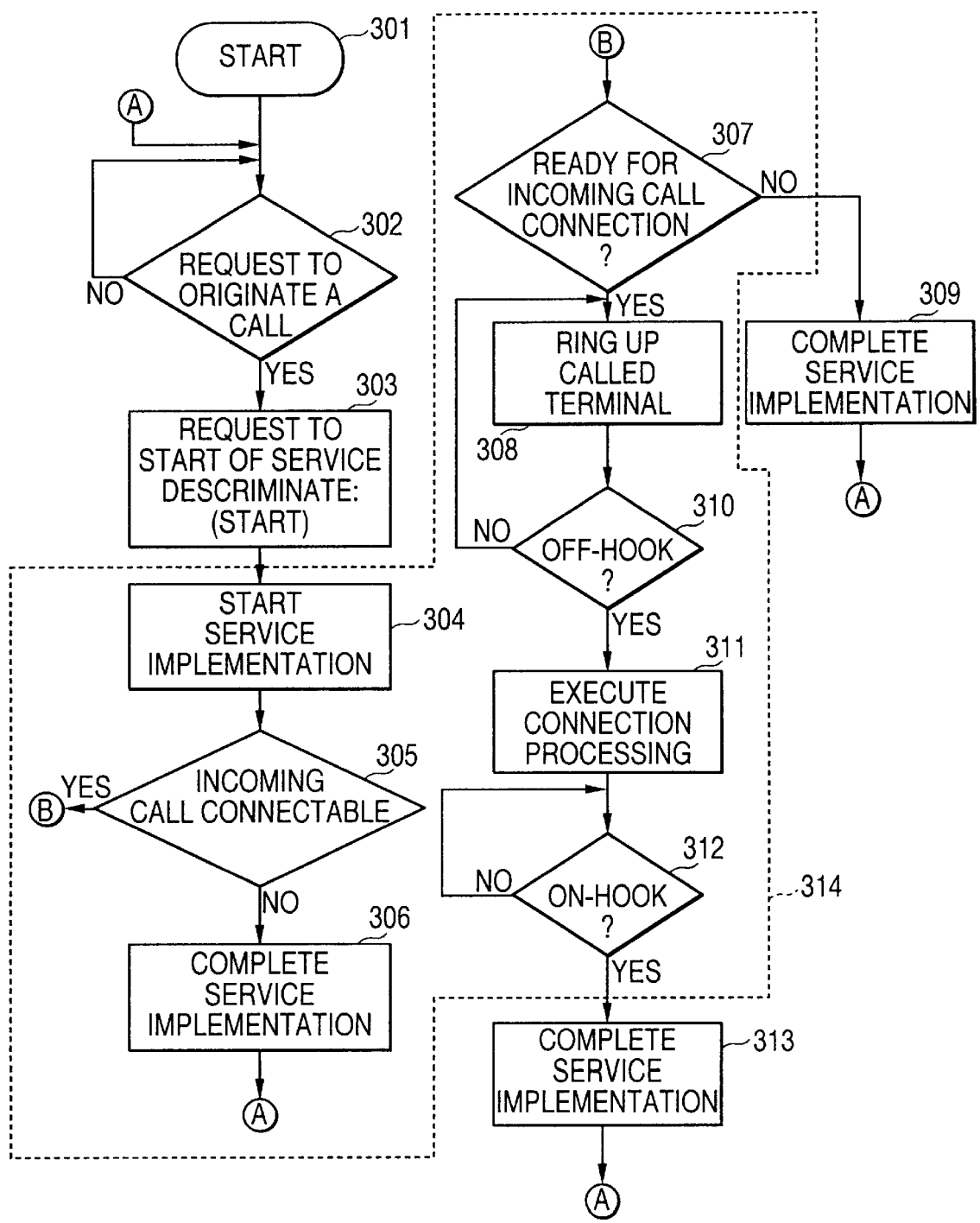
FIG. 4 is a flowchart illustrating the processing by a service controller in this embodiment.

Referring to FIGS. 3 and 4, the first embodiment of the present invention is described with regards to its functioning. FIG. 4 is a flowchart illustrating one functional example of the first embodiment and showing the basic connection processing of a communication service.

Before the start of a communication service, service control unit 101 drives service implementation device 251 and thereafter keeps on the initialized state, which is one of the states available from terminal controller 121, through terminal control interface 271. Through this process, subscriber circuit controller 211 is initialized and subsequently goes into a state of monitoring of terminal 241 (steps 301 and 302). At this stage, terminal controller 121 is fed with the information concerning terminal 241 by way of subscriber circuit controller 211 and then stores this information into terminal control-use memory 171, while at the same time being allowed to register the information about terminal 241 in address resolution controller 151 via address resolution control interface 275 as occasion demands.

When terminal 241 sends out a certain service start request, subscriber circuit controller 211 detects this request and then informs arrival of this request to terminal controller 121 through apparatus control interface 261. Upon reception of this information, terminal controller 121 reads the contents of the request according to its internal processing procedure stored therein, and subsequently writes necessary information into terminal control-use memory 171, while at the same time effecting an examination processing as to what action is to be made for the request (step 303).

In this embodiment, as a result of this examination processing, a decision is made to actuate service controller 111.

Service control unit 101 receives the result from the examination processing by terminal controller 121 and then instructs service implementation device 251 to actuate service controller 111 (step 304).

With reference to FIG. 4, the scope of operation started from step 304 is marked within dotted line 314, and the scope of operation surrounded by dotted line 314 coincides with the operating procedure stored in service controller 111.

Next, service controller 111 requests terminal controller 121, through terminal control interface 271, to read a call incoming terminal address, and in response to this request, terminal controller 121 then reads out the call incoming terminal address from the information stored in terminal control-use memory 171, then reports this read-out address information back to service controller 111 in reply to the request.

Service controller 111 shows this address information reported back from terminal controller 121 to address resolution controller 151 through address resolution control interface 275, requesting not only to examine whether or not this address is resolvable, but also to resolve the address when this address is judged resolvable (step 305).

Address resolution controller 151 refers to the address resolution logic stored therein and the contents of address resolution control-use memory 201 to judge whether or not this address is resolvable, and if judged not resolvable, a finding "null" is sent back to service controller 111 while in case where the address is confirmed resolvable, a further address resolution processing is proceeded to follow by answering to service controller 111 about the result of address resolution.

In case where the result from the address resolution processing by address resolution controller 151 turns out "null," service controller 111 starts a service implementation to terminate the processing (step 306). To terminate service implementation, it is necessary at this stage to release the devices reserved in use for service implementation; the reserved devices are a part of terminal control-use memory 171 and subscriber circuit controller 211.

Service controller 111 instructs terminal controller 121, through terminal control interface 271, to release the devices, and in response to this instruction, terminal controller 121 not only releases the used region of the terminal control-use memory 171 but also instructs the service implementation termination and re-initialization to subscriber circuit controller 211 through apparatus control interface 261.

When subscriber circuit controller 211 executes initialization, terminal controller 121 informs service controller 111 about completion of the service implementation termination processing. In response to this information, service controller 111 completes its processing while terminal controller 121 returns to an initial state (namely, back to step 302).

In case the address resolution processing is turned out effective, in response to the answer from address resolution controller 151, service controller 111 requests terminal controller 122 corresponding to terminal 242, to execute inquiry whether the called terminal is allowable or not through terminal control interface 272, (step 307).

Upon reception of the inquiry, terminal controller 122 reads terminal control-use memory 172, then starts an acceptance control processing to examine whether or not the incoming call is acceptable, and sends back a finding of the examination together with the reason of a consequential judgment to service controller 111.

Service controller 111 receives an answer from terminal controller 122, and reads the answer from terminal controller 122 over the reason of this refusal if the received answer is an incoming call refusal, then starts a service implementation termination processing according to the reason of the refusal.

As this service implementation termination processing varies in procedure according to request originating-side terminal controller 121 how to present the reason of an incoming call refusal to terminal 241, so after a judgment by service controller 111 and terminal controller 121, via terminal control interface 271, the method necessary to undertake the service implementation terminative processing, subsequently executing thereof.

In case where service controller 111 has received an answer of incoming call acceptable from terminal controller 122, service controller 111 not only informs call originating-side terminal controller 121, through terminal control interface 271, of a fact that a call processing is in progress, but also requests called terminal side terminal controller, 122, through terminal control interface 272, to start ringing to the called terminal (step 308).

Terminal controller 121 requests subscriber circuit controller 211 to inform terminal 241 of a fact that the call processing is in progress while in response to this request, subscriber circuit controller 211 informs terminal 241 of that fact. Terminal controller 122 requests subscriber circuit controller 212 to inform terminal 242 of a fact that there is an incoming call request addressing to terminal 242, and in response to this request, subscriber circuit controller 212 informs terminal 242 of that fact.

Service controller 111 next instructs terminal controller 122, through terminal control interface 272, to wait until the commencement of a speech is allowed, and to answer by sending out the information that the speech is get through (step 310).

Terminal controller 122 starts a speech standby control processing functioned therein and instructs subscriber circuit controller 212 to monitor terminal 242 over an off-hook (taking-up of the handset) condition.

Subscriber circuit controller 212 monitors terminal 242 and transfers the information of a change of state thereof to terminal controller 122 as required.

Following the information received, terminal controller 122 and service controller 111 selects which one of the steps is to be taken next. In the example shown in FIG. 4, the step to be taken when being no off-hook in step 310 is so defined as to go back to step 308; therefore, the change of state other than off-hook is ignored.

When terminal 242 goes into the state of off-hook, and service controller 111 is informed subsequently thereof through subscriber circuit controller 212 and terminal controller 122, service controller 111 then starts the processing for coupling terminals 241 and 242 with one another (step 311).

This processing involves the steps as follows:

(a) a step of selecting connection controller 131, noting the physical positional relation between subscriber circuit controllers 211 and 212;

(b) a step of instructing connection controller 131, upon requesting thereto via connection control interface 273 to secure an actual switching device (resource) such as a switching capacity source, etc. and undertake an initialization, to provide necessary information by way of connection control interface 273, so that the processing for coupling subscriber circuit controllers 211 and 212 together may be executed;

(c) a step of selecting media controller 141 to put it into use as occasion demands so that there may be provided matching between the communication media and the signaling speeds which both terminals 241 and 242 can apply;

(d) a step of instructing media controller 141, via media control interface 274, to execute the processing for securing a device (resource) which becomes necessary; and (e) a step of calling connection controller 131 through connection control interface 273 to control switching controller 221 so that the function of a media controller may be used as occasion demands.

Upon completing this processing, service controller 111 informs not only terminal controller 121, via terminal control interface 271, but also terminal 122, through terminal control interface 272, of readiness of a speech.

Upon receiving the information about readiness of a speech, these terminal controllers 121 and 122 advise their counterpart subscriber circuit controllers 211 and 212 respectively of the processing required to commence a speech.

Next, service controller 111 not only instructs terminal controller 121, via terminal control interface 271, and terminal controller 122, by way of terminal control interface 272, to monitor the terminal concerned over a change of state to on-hook (hanging-up of a handset) but also gathers the information regarding a call originating party from terminal controller 121 through terminal control interface 271 to charge the call originating party so as to write the information about the call originating party and the speech start time into service control-use memory 161 (step 312).

When either terminal 241 or 242 goes into an on-hook state, the terminal controller corresponding to the terminal, whichever has gone into the state of on-hook, detects the change of state, sending out the information thereof to service controller 111. Upon reception of this information, service controller 111 starts the service implementation terminative processing (step 313).

First, service controller 111 instructs terminal controllers 121 and 122, respectively via terminal control interfaces 271 and 272, to execute the service implementation termination processing, and waits until being informed about completion of the service implementation termination processing.

Terminal controller 121 detects the condition of subscriber circuit controller 211, and if an off-hook state is found, it executes the service implementation termination processing to release terminal control use memory 171, then upon re-initializing said subscriber circuit controller 211 and thereafter informs service controller 111 that the service implementation terminative processing is over.

If terminal controller 121 detects that subscriber circuit controller 211 is still monitoring remaining in the state other than on-hook, subscriber circuit controller 211 is instructed, via apparatus control interface 261, to inform terminal 241 about completion of the call processing service, and then after subscriber circuit controller 211 keeps monitoring until terminal 241 changes the state to on-hook, the service termination processing is executed for releasing terminal control-use memory 171, then upon the re-initialization of subscriber circuit controller 211, then informing service controller 111 of the service implementation terminative processing being over.

Terminal controller 122 detects the condition of subscriber circuit controller 212, and if the on-hook state is detected prevailing therein, the former executes the service implementation terminative processing for releasing terminal control-use memory 172 then upon re-initializing subscriber circuit controller 212, then the completion of the service termination processing is informed to service controller 111.

If the on-hook state is not detected in subscriber circuit controller 212 yet, subscriber circuit controller 212 is instructed, via apparatus control interface 261, to inform terminal 242 of service implementation is over, and then after subscriber circuit controller 212 keeps standing by until a conditional change into the on-hook state, the service implementation termination processing is executed for releasing terminal control-use memory 172, or else otherwise upon the re-initialization of subscriber circuit controller 212, followed by informing service controller 111 of the service implementation termination processing being over.

Then, upon receiving from both terminals the information about completion of the service implementation termination processing, service controller 111 releases other devices which have been secured to implement the service concerned, and subsequently executes the processing for charging, based on the information of a call originating terminal and the time of service commencement stored in service control-use memory 161, subsequently storing the result of this processing into terminal control-use memory 161 and returning to its initial state.

A case, wherein a communication apparatus with the operating procedure contained therein is introduced which is different from that of the communication apparatus in the first embodiment of the present invention, is referred to as a modified example of the first embodiment.

Figure 5:
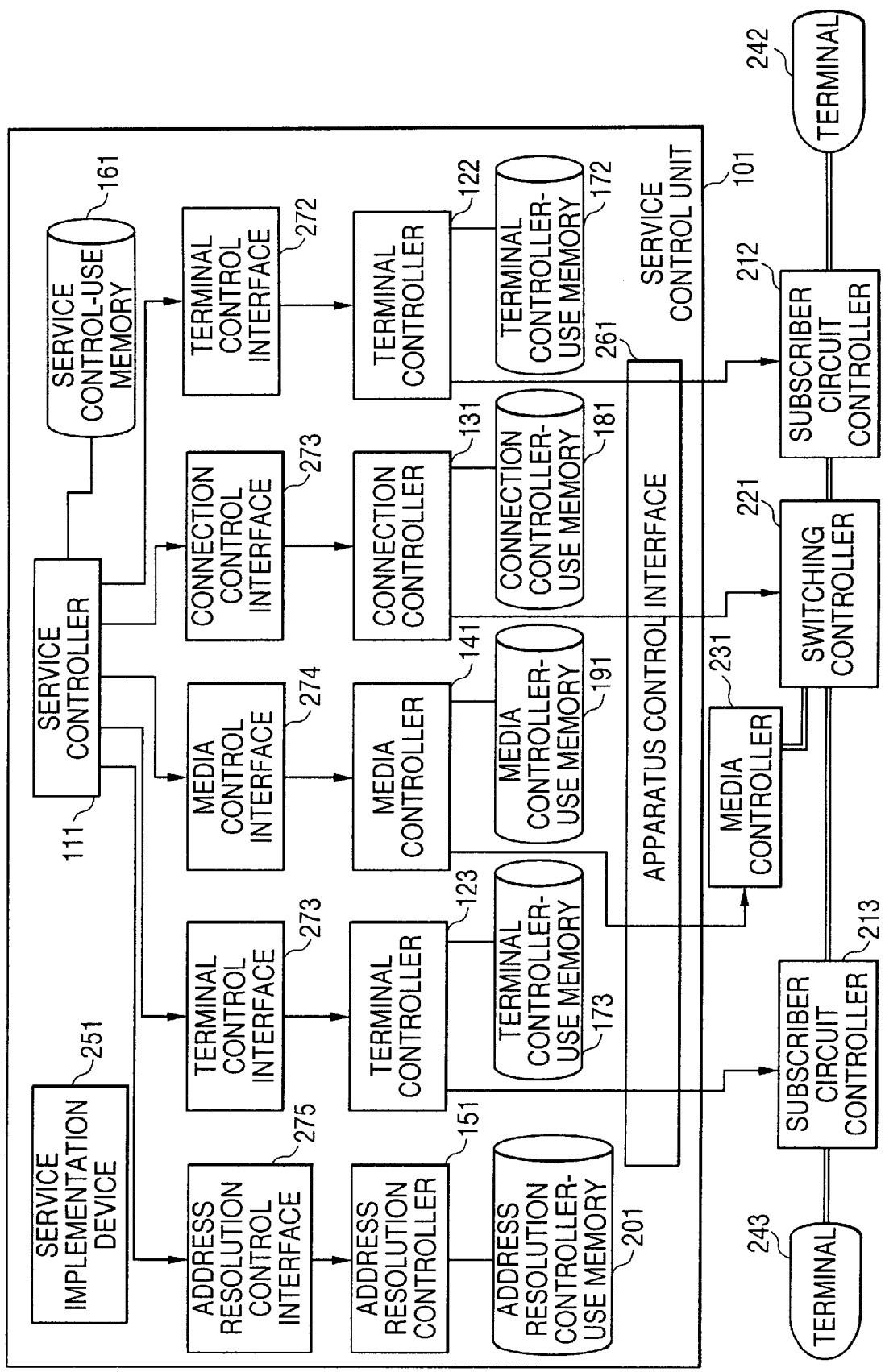
FIG. 5 is a block diagram showing a functional configuration and an operating environment into which different communication apparatus are introduced, in the first embodiment of the present invention.

With reference to FIG. 5, terminal controller 123, subscriber circuit controller 213 and terminal 243 are the communication apparatus different from those in FIG. 3.

Subscriber circuit controller 213 is operated according to a control procedure different from that of subscriber circuit controller 211. Likewise, terminal 243 goes, following the control procedure different from that of terminal 241. Therefore to match a operating procedural difference, the respective components such as terminal control interface 273, terminal controller 123 and terminal control-use memory 173 are varied from those illustrated in FIG.

Though subscriber circuit controller 213 and terminal 243 are different from those in said first embodiment shown in FIG. 3, the logical roles of these respective devices have similarity respectively between subscriber circuit controllers 213 and 211 and between terminals 243 and 241; in view of this, terminal controller 123 is provided with the function capable of encoding the functions controllable for a group of communication apparatus and externally calling a group of encoded functions, thus being equal terminal controller 121 over the identity of its functional type.

The difference in this case lie in the type of internal circuitry installation between terminal controllers 121 and 123 and also in the terminal control system discriminating information between them, which information each denotes a request of calling of respective functions.

The difference in the type of internal circuitry installation of terminal controller exists in the internal construction of each terminal controller. Further, the difference in the terminal control system discriminating information of request to call of respective functions consists in the difference in a table of relation (conversion table) which is provided in the terminal control interface. Accordingly, the effects of installing terminal 243 and subscriber circuit controller 213 serviceability in the existing system are limited to system internal additional installation of terminal control interface 273, and the modification of terminal controller 123 and terminal control-use memory 173, not requiring to modify external controllers such as service controller 111, etc.

Next, the effect and the result of the first embodiment according to the present invention are described hereunder. In the first embodiment of the present invention, the operating procedure of communication apparatus is separate from that of service controller 111, whereby even in case that the telecommunications apparatus different from existing telecommunications apparatus are controlled from service control unit 101, controlling is allowed by modifying only the controller which is in charge of controlling the communicating apparatus concerned, and its interface, without modifying other parts. Therefore, the result is that the amount of a change in the operating procedure stored in the controller in charge is greatly reduced when new telecommunications apparatus are connected to the service controller unit.

Furthermore, since a preliminary processing to call control procedures of telecommunications apparatus from service controller 111 occurs at the time of each, execution, the task to enable service implementation to control the new telecommunications apparatus different from the existing service control unit is practicable without compiling new configuration by service controller 251 while service implementation is under way.

Next, to illustrate the first embodiment of the present invention in further detail, the operation thereof is described hereunder in detail with direct reference thereto.

With reference to FIG. 3, it is assumed that terminal number "123-4567" is allocated to terminal 241 and terminal number "123-4568" to terminal 241. At the point prior to the start of a telecommunications service, service control unit 101 drives service implementation device 251 and keeps on, via terminal control interface 271, an initializing function which is one of those available from terminal controller 121. With this step taken, subscriber circuit controller 211 is initialized, getting into a state of monitoring the condition of terminal 241 (steps 301 and 302 in FIG. 4).

At this stage, terminal controller 121 gets the information regarding terminal 241 through subscriber circuit controller 211, then loads the received information into terminal control-use memory 171, while at the same time registering the information about terminal 241 in address resolution controller 151 via address resolution control interface 275.

Since the terminal coupled to subscriber circuit controller 211 has had its terminal number "1213-4567" registered previously in address resolution control-use memory 201, address resolution controller 151 at this stage newly registers the correspondence between terminal number "123-4567" and terminal controller 121 in resolution control-use memory 201. Terminal controller 121 is reported back with the result of this registration and identifies the terminal number of terminal 241 of which terminal controller 121 takes charge, and writes it into terminal control-use memory 171 for storage therein.

Likewise, as regards terminal 242, address resolution controller 151 newly registers the correspondence between terminal number "123-4568" of terminal 242 and terminal controller 122 in address resolution control-use memory. Terminal controller 122 is fed back with the result of this registration and identifies the terminal number of terminal 242 of which terminal controller 122 takes charge, and writes it into terminal control-use memory 172 for storage therein.

When terminal 241 sends out a regular telephone service start request specifying terminal number "123-4568" as a called terminal number, subscriber circuit controller 211 detects this request, and informs terminal controller 121, via apparatus control interface 261, of arrival of this request.

Upon reception of this request (a regular telephone service start request), terminal controller 121 reads the contents of said request according to the processing procedure contained therein, then writing the necessary information such as a called terminal number "123-4568", etc. into terminal control-use memory 171, subsequently examining which one of operational steps is required to be taken for said request (step 303 in FIG. 4), and deciding to actuate regular telephone service controller 111.

Upon receiving the examination result from terminal controller 121, service control unit 101 instructs service implementation device 251 to drive service controller 111 (step 304).

Subsequently, service controller 111 requests terminal controller 121, via terminal control interface 271, to read the call incoming terminal address while terminal controller 121 reads out called terminal address "123-4568" from the information stored in terminal control-use memory 171 in response to said request and then feeds back this terminal address information to service controller 111 in reply to said request. Service controller 111 shows the terminal address information fed back from terminal controller 121 to address resolution controller 151 through address resolution control interface 275, requesting to examine whether or not the terminal address concerned is resolvable and to resolve said terminal address concerned in case where said address is found resolvable (step 305).

Address resolution controller 151, referring to the address resolution logic contained therein and the contents of address resolution control-use memory 201, judges that call incoming terminal address "123-4568" is resolvable; the consequence of this address resolution is terminal 242; and the terminal controller corresponding to this terminal is terminal controller 122, subsequently answers to the consequence of the address resolution to service controller 111.

Following the answer from address resolution controller 151, service controller 111 requests terminal controller 122, which corresponds to terminal 242, a call incoming terminal, via terminal control interface 272, to execute an inquiry processing as regards whether or not an incoming call is acceptable (step 307 in FIG. 4).

Upon receiving this request, terminal controller 122 reads terminal control-use memory 172 and starts a request acceptance control processing contained therein, wherein for example, by judging, referring to the table provided inside, whether or not the call originating-side terminal number "123-4567" is connectable, a judgment processing of whether said incoming call is connectable or not is effected, answering to service controller 111 the result of judgment together with the reason for attainment of this judgment.

In case where service controller 111 has received an answer that the incoming call connectable from terminal controller 122, service controller 111 informs call originating-side terminal controller 121, via terminal control interface 271, of a fact that a call processing is in progress upon reception of a call request, while at the same time requesting call incoming-side terminal controller 122, via terminal control interface 272, to start a ringing processing (step 308 in FIG. 4).

Terminal controller 121 requests subscriber circuit controller 211 to inform terminal 241 of the call processing being under way, while upon receiving this request, subscriber circuit controller 211 informs terminal 241 that the call processing is in progress by sending a ring-back tone.

Terminal controller 122 requests subscriber circuit controller 212 to inform terminal 242 of a fact that there is an incoming call, while upon receiving this call, subscriber circuit controller 212 then informs terminal 242 of this fact by ringing Service controller 111 next instructs terminal controller 122, through terminal control interface 272, to wait until the speech path is ready to get through and to inform that the line is ready to get through (step 310 in FIG. 4). Terminal controller 122 then starts a speech path connection standby control processing contained therein, and subsequently instructs subscriber circuit controller 212 to monitor terminal 242 over its state transference to an off-hook state.

When terminal 242 goes into the off-hook state, with this state transference informed to service controller 111 via subscriber circuit controller 212 and terminal controller 122, service controller 111 then starts a connection processing for connecting terminals 241 and 242 one another (step 311). Precisely, service controller 111 starts a routine processing contained therein, with the result from this routing processing in this embodiment corresponding connection controller is concluded to connection controller 131, since subscriber circuit controllers 211 and 212 are connected directly to one switching controller 221.

Connection controller 131 is requested to execute a processing for circuit-switching of terminals 241 and 242 represented by terminal controllers 121 and 122 according to the regular voice band transmission circuits. In response to this request, connection controller 131 inquires terminal controllers 121 and 122, via respective terminal control interfaces 271 and 272, how subscriber circuit controllers 211 and 212 are connected physically to switching controller 221, and controls switching controller 221, following the answers by terminal controllers 121 and 122 to the inquiry, and the setting information of switching controller 221 which is stored in connection control-use memory 181.

Assuming in this embodiment that subscriber circuit controller 211 for example is connected to the first port of switching controller 221 while subscriber circuit controller 212 is connected to the second port of switching controller 221, connection controller 131 controls switching controller 221, through apparatus control interface 261, to couple the first and second port with each other.

Next, service controller 111 informs terminal controllers 121 and 122 respectively via terminal control interface 271 and terminal control interface 272 of readiness of a speech. Upon receiving this information, terminal controllers 121 and 122 advise each of subscriber circuit controllers 221 and 212, of which they take charge respectively, of the processing necessary for the speech path connection. In this embodiment, lighting of the busy indication lamp provided on each terminal for example corresponds to this advice.

Subsequently, service controller 111 instructs terminal controllers 121 and 122, respectively via terminal control interfaces 271 and 272 to monitor terminals 241 and 242 state transition to the on-hook state, then gathers the call subscriber information from terminal controller 1211 through terminal control interface 271 so as to charge the call subscriber for the communication service, and writes the call subscriber information and the time of speech commencement in service control-use memory 161 for storage therein (step 312 in FIG. 4).

Next, supposing that terminal 241 has gone into the on-hook state, terminal controller 121 corresponding to terminal 241 detects this conditional change, subsequently sending out the conditional change information to service controller 111. Upon receiving this information, service controller 111 starts the service implementation terminative processing (step 313 in FIG. 4).

First, service controller 111 instructs terminal controllers 121 and 122, respectively via terminal control interfaces 271 and 272, to execute the service implementation termination processing, then stands by until informed of a fact that both terminal controllers 121 and 122 are finished said termination processing. As terminal controller 121 detects the condition of subscriber circuit controller 211, detecting the on-hook state, it next executes the service implementation termination processing to release terminal control-use memory 171, then upon reinitializing subscriber circuit controller 211, informing service controller 111 about completion of the service implementation termination processing.

Meanwhile, when terminal controller 122 detects that the subscriber circuit controller 212 detects no on-hook state, then instructs subscriber circuit controller 212, via apparatus control interface 261, to inform terminal 242 of completion of the service implementation, subsequently standing by until the subscriber circuit controller concerned changes into its state to the on-hook state. Upon reception of this instruction, subscriber circuit controller 212 transmits a speech path cut-off tone to terminal 242, and then keeps standing by until terminal 242 goes into the on-hook state. Then, when terminal 242 turns into the on-hook state, the condition of subscriber circuit controller 212 likewise goes into the on-hook state, informing terminal controller 122 of its conditional shift to the on-hook state. In response to this information, terminal controller 122 gets out of a standby state and executes the service implementation termination processing to release terminal control-use memory 172, etc., subsequently informing service controller 111 about completion of the service termination processing.

Service controller 111, when being informed about completion of the service implementation termination processing, then releases other devices which have been secured for service implementation, thereafter executes a charge processing, based on the calling subscriber information and the time of service commencement stored in service control-use memory 161, and gets back to the initial condition after writing the charge processing data into service control-use memory 161 for storage therein.

Figure 6:
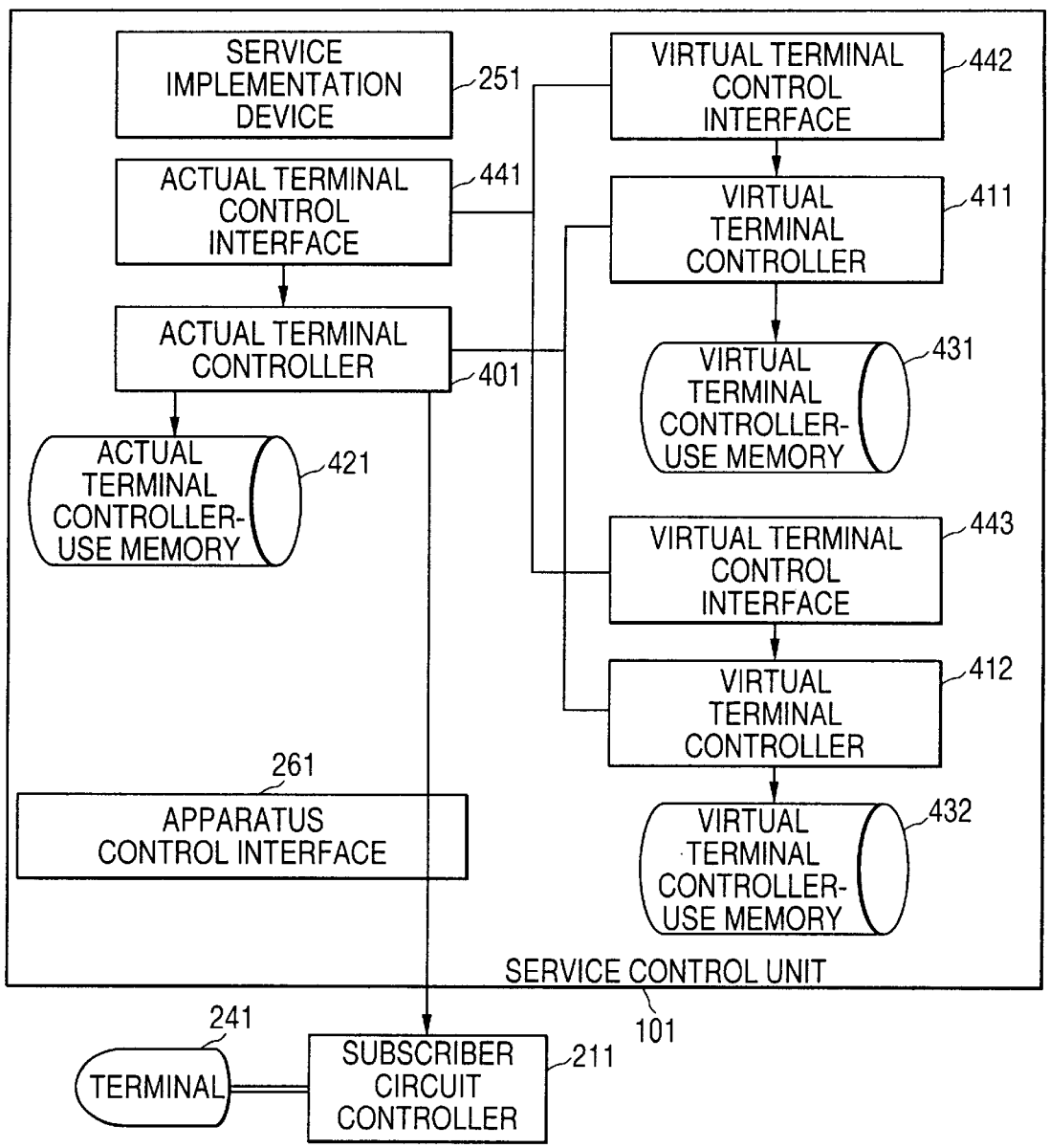
FIG. 6 is a block diagram illustrating the second embodiment of the present invention and also showing a functional configuration and an operating environment in which a virtual terminal function is implemented.

Next, referring to the drawings, the second embodiment of the present invention is described hereunder in detail. FIG. 6 is a block diagram illustrating the configuration of the second embodiment of the present invention.

Referring to FIG. 6, the second embodiment of the present invention different from said first embodiment in that the controller corresponding to terminal 24 land subscriber circuit controller comprises actual terminal controller 401 and virtual terminal controllers 411 and 412 (which are confirmed as actual terminal when they are resolved actual address terminals), and also in that each controller is provided with a control interface and a control-use memory.

Virtual terminal control interface 441 is caused to correspond to virtual terminal controller 401 and keeps a table of relation between the information required to call a control procedure which is actually provided in virtual terminal controller 401, and the terminal control procedure discriminating information obtainable as a result of previous encodement of the control procedures by classifying as a plurality of groups of practicable standardized control procedures.

Further, actual terminal control interface 441 is associated with virtual terminal control interfaces 442 and 443 corresponding respectively to the virtual terminal controller derived from actual terminal controller 401, thus being controllable with each other.

Actual terminal controller 401 is provided encoding functions of subscriber circuit controller 211 and terminal 241 which is controlled by actual terminal controller 121 through 211 so that the encoded functions are set to be called out from other controllers as a group, and further to control subscriber circuit controller 211 through apparatus control interface 261 and also terminal 241 via subscriber circuit controller 211. Further, actual terminal controller 401 keeps the temporary storage information necessary to drive actual terminal controller 401 in actual terminal control exclusive-use memory 421. Besides, actual terminal controller 401 is associated with virtual terminal controllers 411 and 412 derived from said actual terminal controller 401, thus being controllable with each other by way of each respective virtual terminal control interfaces.

Virtual terminal control interface 442 is caused to correspond to virtual terminal controller 411 and keeps a table of relation between the information required to call a control procedure which is actually provided in virtual terminal controller 411, and the terminal control procedure discriminating information obtainable as a result of previous encodement of the control procedures by classifying as a plurality of groups of practicable standardized control procedures.

Virtual terminal controller 411 is a device having such a function to encode the function of subscriber circuit controller 211 and groups of functions integrating respective services as a virtual terminal out of those of terminal 241 that are controllable from actual terminal controller 121 via subscriber circuit controller 211, and to set all encoded grouped functions allowed to be called out externally, and to execute actual control via actual terminal controller 401.

Further, actual terminal controller 411 keeps the temporary storage information necessary to drive actual terminal controller 411 in virtual terminal control exclusive-use memory 431.

Virtual terminal control interface 443 is caused to correspond to virtual terminal controller 412 and keeps a table of relation between the information required to call a control procedure which is actually provided in virtual terminal controller 412, and the terminal control procedure discriminating information obtainable as a result of previous encodement of the control procedures by classifying as a plurality of groups of practicable standardized control procedures.

Virtual terminal controller 412 is a device having a function to encode the function of subscriber circuit controller 211 and group of functions integrating respective service as a virtual terminal out of those of terminal 241 that are controllable from actual terminal controller 401 via subscriber circuit controller 211, and set all encoded group of functions allowed to be called out externally, and to execute actual control via actual terminal controller 401. Further, virtual terminal controller 412 stores the temporary information necessary to drive virtual terminal controller 412 in virtual terminal control-use memory 432.

The second embodiment of the present invention is described hereunder in detail over its function. With reference to FIG. 6, except of 401~443 which are associated with terminal 241 and subscriber circuit controller 211 are omitted to describe because rest portions are the same to the first embodiment shown in FIG. 3. In view of this, the description of the same portion is omitted here.

In said first embodiment, as terminal 241 corresponds to terminal controller 121, so the first embodiment cannot correspond to a virtual terminal which is physically counted an existing terminal but is possible to be treated a plurality of terminals of ISDN (Integrated Services Digital Network) or the ATM (Asynchronous Transfer Mode).

In this embodiment, there is provided a configuration capable of meeting the case wherein a virtual terminal controller is allocated to each one of virtual terminals, whereby a terminal which is physical one, is nevertheless virtually workable as a plurality of terminals. In other words, actual terminal controller 401, actual terminal control-use memory 421 and actual terminal control interface 441 are provided in consideration of the correspondence to such physical entities as terminal 241 and subscriber circuit controller 211, while virtual terminal controllers 411~412, virtual terminal control-use memories 431~432 and virtual terminal control interfaces 442~443 are prepared in views of that they may correspond to virtual terminals.

Actual terminal control interface 441 and virtual terminal control interfaces 442~443 operate identically to the exterior. Therefore, as regards the means to call each of these interfaces, it is unnecessary to discriminates whether an called entity is an interface corresponding to an actual terminal or to a virtual terminal. The operation to be undertaken in the case where an interface has been called, is carried out by exchanging requested specific operational control procedures which are assigned to each respective controllers at every stage of implementation, after the operation request has once been handed over to each of corresponding actual terminal controller 401 and virtual terminal controllers 411~412.

Actual implementation of the operation described above is shared by actual terminal controller 401 for the processing of terminal 241 and subscriber circuit controller 211 and shared by virtual terminal controller 411 to 412 for the processing of virtual terminals. But in order to avoid the contradiction of issuance of instructions, virtual terminal controller 411 to 412 send control instructions through actual terminal controller 401 indirectly to telecommunications devices.

Said second embodiment of the present invention is further described hereunder in detail.

With reference to FIG. 6, it is assumed that terminal 241 is an ATM terminal and the signaling system of said terminal 241 is of a ATM Forum's UN13.1. As an initializing step at the point prior to starting to implement the communication service, actual terminal controller 401 drives subscriber circuit controller 211 via apparatus control interface 261 for due setting so that actual terminal controller 401 may read and write the virtual path for use in the communication with terminal 241 over UNI signaling information. Then, it is assumed that as an operational instance of this embodiment, a via-UNI (Use Network Interface) regular connections would be undertaken as communication service implementations.

First, an operating example of the case where terminal 241 transmits a call request, is illustrated here. When terminal 241 sends out a call request (a setup message), actual terminal controller 401 receives this request through the initial setting referred to in the foregoing. Actual terminal controller 401 analyzes the contents of a call request message, discriminating that this request is a call request, and makes ready for subsequent control by generating virtual terminal controller 411, virtual terminal control-use memory 431 and virtual terminal control interface 442 and then writing the identifier of virtual terminal controller 411 into actual terminal control-use memory 421.

Next, actual terminal controller 401 shows the call request message to virtual terminal controller 411 and then instructs thereto to execute an call operation. In views of the fact that excepting the call operation which will be described later, subsequent operations are the same as those with the case of said first embodiment, so the description thereof is omitted.

Here, a description is given of the operation for the case of accepting an incoming call request. The relation between an ATM address which is the terminal number of terminal 241, and the actual terminal controller is written previously into address resolution control-use memory 201, similarly to the case of said first embodiment. It is assumed here that the service controller completed of deciding the ATM address of a called terminal. Next, it is further assumed that the service controller showed address resolution controller 151 the ATM address of the called terminal through address resolution control interface 275 to request for address resolution, and that in reply to this request, actual terminal controller 401 is reported the result of address resolution.

This service controller requests actual terminal controller 401, via actual terminal control interface 441, to execute an inquiry processing whether an incoming call is accepted or not. Upon receiving this request, actual terminal controller 401 first generates virtual terminal controller 412, virtual terminal control-use memory 432 and virtual terminal control interface 443, and thereafter transfers the call incoming request to virtual terminal control interface 443, requesting to execute an examination processing whether the incoming call request is acceptable or not.

Upon receiving an examination processing request, virtual terminal controller 412 reads virtual terminal control-use memory 432, then starts a built-in request acceptance processing or occasionally, calling actual terminal control-use memory 421 through actual terminal controller 401, or else calling built-in acceptance control processing of actual terminal controller 401 to execute a judgment processing finally as to whether or not the incoming call request is accepted, and then reports the result thereof together with the reason of the judgment to the service controller.

Thereafter, as regards implementation of the telecommunication service concerned, the terminal controller continues implementing said service, with virtual terminal controller 412 communicating with the exterior, and calling actual terminal controller 401 occasionally.

Describing the effect and the result of said second embodiment of the present invention, in the second embodiment, even in case where the actual terminal has a virtual terminal function, it is not required to modify other portions than the internal circuitry installation portion of a group of controllers associated with said terminal by properly dividing and installing the terminal control interface, terminal controller and terminal control-use memory.

This enables to reduce the amount of a change in the built-in operating procedure contained in the controller is greatly cut even when a new additional telecommunications apparatus (telecommunications terminal devices, each with a virtual terminal function in this instance) are connected to the existing service controller.

Figure 7:
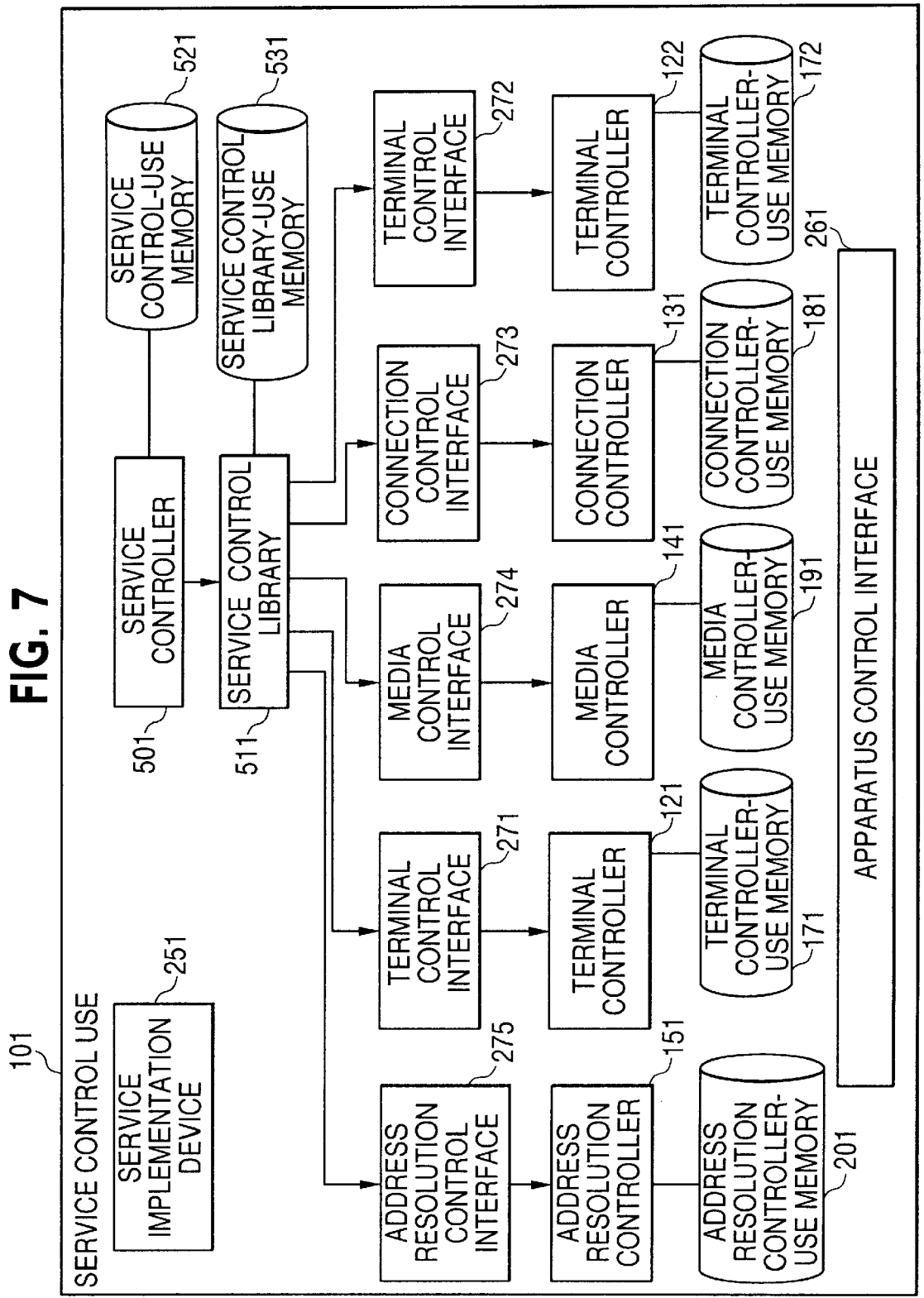
FIG. 7 is a block diagram illustrating the third embodiment of the present invention and also showing a functional configuration and an operating environment, wherein a service control library is applied.

Next, referring to the drawings, the third embodiment of the present invention is described hereunder in detail. FIG. 7 is a block diagram illustrating the third embodiment of the present invention.

In contrast to said first embodiment illustrated in FIG. 3, wherein service controller 111 is configured to directly call controllers having the encoded function of each communication apparatus, referring to FIG. 7, the third embodiment of the present invention is found showing a difference in that service controller 501 effects an indirect call via service control library 511.

Service controller 501 implementing telecommunications services each by controlling telecommunications apparatus applies service control library 511 in combination with service control-use memory 521 which is a temporary storage serving to actuate service controller 501. While using service control library-use memory 531 as a temporary storage, service control library 511 in the first embodiment of the present invention calls the functions respectively of terminal controllers 121 to 122, connection controller 131, media controller 141 and address resolution controller 151 via terminal control interfaces 271 to 272, connection control interface 273, media control interface 274, address resolution interface 275, etc. according to the procedure similar to that which service controller applies for calling each telecommunications apparatus control means.

The third embodiment of the present invention is described hereunder in detail over its functioning.

With reference to FIG. 7, excepting service controller 501, service control-use memory 521, service control library 511 and service control library-use memory 531, the third embodiment according the present invention is identical with the embodiment shown in FIG. 1, so the description of functions of them are omitted. In said first embodiment, service controller 111 is observed to directly call such interfaces as terminal control interface 271, etc. Further, in FIG. 1 which presents one example of the conventional communication service control system, it is observed that service controller 801 calls the function of service common management/controller 821. Therefore, even though service controllers 801 and 111 are described to implement the same service, the contents of these descriptions differ completely.

In the third embodiment of the present invention, service control library 511 having the same function as that of the conventional service common management/controller 821 is so installed to call the functions respectively of terminal controllers 121 to 122, connection controller 131, media controller 141 and address resolution controller 151 through terminal control interfaces 271 to 272, connection control interface 273, media control interface 274, address resolution control interface 275, etc. while service controller 501 is adapted to call the function of service control library 511.

In other words, while using service control-use memory 521 as a temporary storage according to the operating procedure previously defined, service controller 501 call the function of service control library 511. To execute the called function, using service control library-use memory 531, as occasion demands, according to the controller defined previously for each service implementing function, service control library 511 calls the functions respectively of terminal controllers 121 to 122, connection controller 131, media controller 141 and address resolution controller 151 via terminal control interfaces 271 to 272, connection control interface 273, media control interface 274, address resolution control interface 275, etc.

The third embodiment of the present invention referred to above is further described in detail. It is noted here that in FIG. 7, though subscriber circuit controller 211 to 212, switching controller 221, media controller 231 and terminals 241 to 242 are omitted of presentation, these devices are assumed to be connected together likewise in FIG. 3.

Referring to FIG. 7, it is assumed that terminals 241 and 242 have terminal numbers "123-4567" and "123-4568" allocated respectively. At a time preceding to the start of a telecommunications service, service control unit 101 drives service implementation device 251 and keeps on, via terminal control interface 271, the function of initialization which is one of function available from terminal controller 121. This step takes place, not only initializing subscriber circuit controller 211 but also driving subscriber circuit controller into a state of monitoring the state of terminal 241 (steps 301 and 302 in FIG. 4).

At this stage, terminal controller 121 receives the information regarding terminal 241 through subscriber circuit controller 211, and then stores the received information into terminal control-use memory 171 while at the same time registers the information about terminal 241 in address resolution controller 151 via address resolution control interface 275. Since in address resolution control-use memory 201, the terminal coupled to subscriber circuit controller 211 has its terminal number "1213-4567" registered previously, address resolution controller 151 at this stage newly registers the correspondence between terminal number "123-4567" and terminal controller 121 in resolution control-use memory 201.

Upon receiving the result of this registration, terminal controller 121 identifies the terminal number of terminal 241 of which terminal controller 121 takes charge, and then writes it in terminal control-use memory 171 for storage therein. Further likewise, as regards terminal 242, address resolution controller 151 newly registers the correspondence between terminal number "123-4568" and terminal controller 122 in address resolution control-use memory 201. Upon receiving the result of this registration, terminal controller 122 identifies the terminal number of terminal 242 of which terminal controller 122 controls, and then writes it in terminal control-use memory 172 for storage therein.

When terminal 241 sends a request of start of a regular telephone call origination service addressing called terminal number "123-4568", subscriber circuit controller 211 detects the request, and informs it to terminal controller 121, via apparatus control interface 261, of arrival of this request. Upon reception of this received request, terminal controller 121 reads the contents of said request according to the processing procedure contained therein, then writing the necessary information such as called terminal number "123-4568," etc. into terminal control-use memory 171, examining operational steps which are required to be executed for said request (step 303 in FIG. 2), and deciding to actuate service controller 501 for the regular telephone call origination service. Upon receiving the result of the examination of processing from terminal controller 121, service control unit 101 instructs service implementation device 251 to drive service controller 501 (step 304).

Next, service controller 501 instructs service control library 511 to get the details of a call request.

Upon receiving this request, service control library 511 requests terminal controller 121, through terminal control interface 271, to read out the telephone numbers as addresses of call originating terminal and the call incoming terminal while in response to this request, terminal controller 121 then reads out from the information stored in terminal control-use memory 171 own terminal address "123-4567" as a call originating terminal address and "123-4568" which has been specified, in the service start request, as a call incoming terminal address, then answers these to service control library 511.

Service control library 511 not only writes the received information in service control library-use memory 531 but also answers said information to service controller 501. Upon receiving these address information, service controller 501 then shows the called terminal address to service control library 511, instructing to examine whether or not the terminal corresponding to said address and the calling terminal are physically allowed to go into the state for a speech.

Upon receiving this instruction, service control library 511 requests address resolution controller 151 via address resolution control interface 275 with a view to retrieving the terminal controller corresponding to the called terminal address to examine whether or not said address is resolvable, and resolve said address when said address is found resolvable. Address resolution controller 151 judges, referring to the address resolution logic which is provided as a proper function, and the contents of address resolution control-use memory 201, that called terminal address "123-4568" is resolvable; the consequence of address resolution is terminal 242; and the terminal controller corresponding to the terminal 242 is terminal controller 122, and then answers the consequence of address resolution to service control library 511.

Service control library 511 receives, via address resolution control interface 275, the result of the examination which address resolution controller 151 conducted, and checks the received examination result.

In this case, as the received examination result indicates that the address resolution is possible, the relation among called terminal address "123-4568," terminal controller 122 and terminal 242 is written into service control library-use memory 531 as address resolution consequent information, and answers to service controller 501 about the result of address examination according to the answering procedure prescribed in the procedure of calling service control library 511. Service controller 501 reads out the address examination result (step 305 in FIG. 2).

In response to the address examination which results physical connectivity, service controller 501 specifies the call originating terminal number and the called terminal number to service control library 511, requesting to execute the inquiry processing as regards whether or not the called terminal is ready to accept an incoming call (step 307 in FIG. 4). It is noted here that since at this stage, service control library 511 keeps in service control library-use memory 531 the received answer to an address resolution request which is made previously to address resolution controller 151, it is unnecessary to re-retrieve the relation between called terminal number "123-4568" and terminal controller 122.

Upon receiving this request, service control library 511 shows the call originating terminal number to terminal controller 122 through terminal control interface 272, requesting to inquire whether or not the incoming call is accepted. Upon receiving said request, terminal controller 122 not only reads terminal control-use memory 172 but also starts an acceptance control processing stored therein, wherein by judging, based on the table provided inside, whether or not call originating side terminal number "123-4567" is connectable, an incoming call acceptance examination processing is executed, followed by the answered result of judgment together with the reason thereof to service control library 511. Upon receiving the result of judgment from the terminal controller 122, service control library 511 feeds back said result to service controller 501 according to the answering system prescribed in the calling procedure of service control library 511. In this embodiment, it is assumed that the answered result shows acceptability of the incoming call.

Judging at this stage that the logical judgment required to implement the service which service controller 501 provides has been completed, service controller 501 instructs service control library 511 to undertake remaining tasks (from step 308 to 313 in FIG. 4), specifying such information as call originating terminal number "123-4567," called terminal "1123-4568", etc. necessary to execute the remaining tasks.

Depending on the category of a service to be implemented, it is also practicable to execute the tasks from step 308 (to ring to the called terminal) to step 313 in FIG. 4 or an another appropriate processing in a manner that the service controller calls service control library 511 separately, without leaving whole tasks to service control library 511.

As service controller 501 completes its role at this stage, service control memory 521, a device which service controller 501 has secured for service implementation, will be released, with said service implementation processing ending up.

Thereafter, service control library 511 executes the steps from 308 to 313 by undertaking the processing similar to that of service controller 111 in said first embodiment.

Describing the effects and the result of the above-remarked third embodiment of to the present invention, it is said that in this third embodiment, the existing service controller is rendered available when the service control library provides the service controller with the function similar to that of the conventional service common management/controller.

Furthermore, as regards internal circuitry installation of service control library, since telecommunications apparatus control procedures are separated from the service control library, similarly to the first embodiment, the service control library is rendered to enable to control different telecommunications apparatus merely by modifying the telecommunications apparatus controller and its interface, with other parts left unaltered. The result is that the amount of a change in the operating procedure included in the service control library can be cut in an attempt to make practicable to control new telecommunications apparatus from the service control library.

The two effects described above enable to cut the amount of a change in the operating procedure included in the existing service controller when new telecommunications apparatus is rendered to put in service under the existing service control system.

Figure 8:
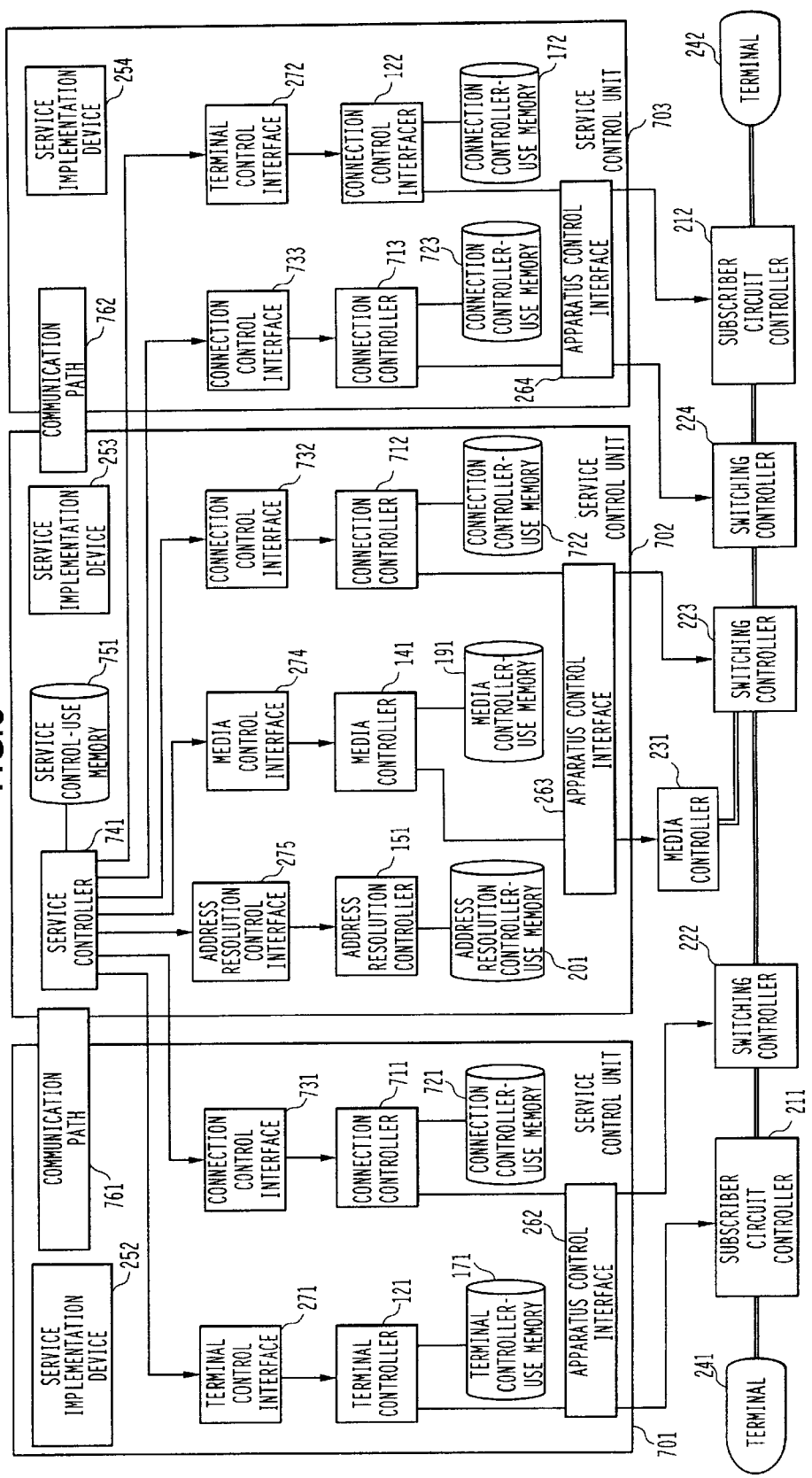
FIG. 8 is a block diagram illustrating the fourth embodiment of the present invention and also showing a functional configuration and an operating environment, wherein communication services are implemented across a plurality of service controllers.

Next, referring to the drawings, the fourth embodiment of the present invention is described in detail. FIG. 8 is a block diagram illustrating the configuration of the fourth embodiment of the present invention.

Referring to FIG. 8, the fourth embodiment of the present invention is different from said first embodiment in respect of items as follows::

(a) a plurality of service control units 701~703 are provided as an independent service control unit respectively;
(b) a plurality of switching controllers 222~224 are provided under control of respective service control units;
(c) in conformance to the existence of plural service control units, there is increased in the number of controllers;
(d) service control units 701 and 702 are connected together via inter-service control unit communication path 761; and
(e) service control units 702 and 703 are connected to each other through inter-service control unit communication path 762.

Service control unit 701 including service implementation device 252 not only controls subscriber circuit controller 211 via apparatus control interface 262 and terminal 241 through subscriber circuit controller, but also controls switching controller 222.

Service control unit 702 provided with service implementation device 253 controls switching controller 223 and media controller 231 via apparatus control interface 263 Service controller furnished with service implementation device 253 not only controls subscriber circuit controller 212 by way of apparatus control interface 263 and terminal 242 via subscriber circuit controller 212, but also controls switching controller 224.

Service control units 701 and 702 are allowed, by respective service implementation devices 252 and 253 controlling inter-service control unit communication path 761, to call respective control interfaces such as terminal control interface 271, connection control interface 732, etc. Meanwhile, service controller units 702 and 703 are likewise allowed, by respective service implementation devices 253 and 254 controlling inter-service control unit communication path 762, to call respective control interfaces such as terminal control interface 272, connection control interface 732, etc.

It is noted here that with reference to the fourth embodiment of the present invention, a description is made of a configurational example wherein three service control units are provided but said embodiment of the present invention is easily applicable to the case where a plurality of service control units more than two are installed.

Next, the fourth embodiment of the present invention is described over its functioning. With reference to FIG. 8, at the time each of respective control interfaces is called, at the time when service implementation device 253 actuates service controller 741, service implementation device 253 examines the information of a called terminal concerned, and then calls the control interface on a called terminal side service controller via the inter-service control unit communication path in the event the called terminal side control interface is provided on the service control unit other than the call originating-side service control unit.

The operation in the foregoing is generally referred to as a remote procedure call (RPC) and is effected by a general type device serving to call a specific function between information processors which can communicate with each other. In FIG. 8, although there is presented such a case, only for the convenience of preparing the drawings, where service controller 741 is actuated to effect the RPC, the RPC is practicable with another controller such as each of connection control interfaces 731~733. Effecting the RPC by each of service implementation devices 252~254 enables to call from each controller the function of another controller via another control interface, no matter which is the service control unit that actuates said call-originating-side controller and said call-incoming controller.

This enables to implement the services defined in respective service controllers, using plural service controllers, without modifying the operating procedural contents defined in various controllers including the service controllers.

To effect the operation in the fourth embodiment of the present invention, which is similar to that in said first embodiment, namely for the case where service controller 111 in said first embodiment is desired to be applied straight as service controller 741, it is possible that a pair of connection control interface and a connection controller are such configured as being a representative connection control interface and connection controller as if they represent a plurality of connection control interfaces and connection controllers. In this case, the representative connection controller writes the entities of other connection controllers into the connection control-use memory corresponding thereto, and when a request is directed from another controller via the connection control interface to the representative connection controller, the representative connection controller calls the function of another connection controller through another connection control interface, in addition to controlling, via the apparatus control interface, the switching controller of which the representative connection controller concerned takes charge.

In case it is allowed that service controller 741 is different from service controller 111, though the operating procedural contents included in service controller 741 are identical, in respect of the sequence of operation, as compared with the contents stored in service controller 111 in said first embodiment, in view of the fact that there is an increased number of switching controllers of which service controller 741 takes charge, the step required to control the communication path between terminals 241 and 242 used to be to call connection controller 131 via connection control interface 273 in said first embodiment while in contrast with this, the step to be taken likewise in the fourth embodiment of the present invention is altered to call connection controllers 711~713 through connection control interfaces 731~734.

Adding this alteration to service controller 741 enables to include a detailed control procedure in service controller 741 for switching controller 222~224.

Next, the fourth embodiment of the present invention is described in detail about its functioning. With reference to FIG. 8, it is assumed that terminals 241 and 242 have terminal numbers "124-4567" and "123-4568" allocated respectively. At the time preceding to the start of a telecommunications service, service controller 701 drives service implementation device 252 and keeps on, via terminal control interface 271, the function of initialization which is available from terminal controller 121. This step takes place, not only initializing subscriber circuit controller 211 but also driving subscriber circuit controller 211 into a state of monitoring the state of terminal 241 (steps 301 and 302 in FIG. 4). At this stage, terminal controller 121 receives the information regarding terminal 241 through subscriber circuit controller 211, then stores the received information into terminal control-use memory 171 while at the same time registers the information about terminal 241 in address resolution controller 151 via address resolution control interface 275, using the remote procedure call.

Since terminal number "123-4567" of the terminal connected to subscriber circuit controller 211 has been registered previously in address resolution control-use memory 201, address resolution controller 151 newly registers the correspondence between terminal number "123-4567" and terminal controller 121 in address resolution control-use memory 201 at this stage. Terminal controller 121 receives the result of this registration and identifies the terminal number of terminal 241 of which terminal controller 121 takes charge, and keeps it stored in terminal control-use memory 171. Further likewise, as regards terminal 242, address resolution controller 151 newly registers the correspondence between terminal number "123-4568" and terminal controller 122 in address resolution control-use memory. Terminal controller 122 is fed back with the result of this registration and identifies the terminal number of terminal 242 of which terminal controller 122 takes charge, and keeps it stored in terminal control-use memory 172.

When terminal 241 sends out a request for the start of a regular call origination telephone service together with terminal number "123-4568" which is identified as a called terminal number, subscriber circuit controller 211 detects the request, and informs terminal controller 121, via apparatus control interface 262, of arrival of this request. Upon reception of this request, terminal controller 121 reads the contents of said request according to the processing procedure which is provided as a proper function, then writing the necessary information such as called terminal number "123-4568", etc. into terminal control-use memory 171, examining which one of operational steps is required to be executed for said request (step 303 in FIG. 4), and deciding to actuate regular telephone service controller 741.

Upon receiving the examination result from terminal controller 121, service controller 701 examines which service control units is to be applied to actuate service controller 741.

The contents of this examination may include the methods as follows::
(a) a method to select service control unit 701 from which a request has originated;
(b) a method to choose a low load service control unit out of plural service control units; and
(c) a method to request terminal controller 121 to undertake a selection processing.

In this embodiment, it is assumed that service control unit 702 has been selected to actuate service controller 741. Depending on the result of this selection, service controller unit 701 instructs service implementation device 253, via the remote procedure call, to actuate service controller 741 (step 304 in FIG. 2).

Next, using the RPC, service controller 741 requests terminal controller 121, via terminal control interface 271, to read out the called terminal address while in response to this request, terminal controller 121 reads out called terminal address "123-4568" from the information stored in terminal control-use memory 171, answering the information of this address to service controller 741 to said request.

Service controller 741 shows this address to address resolution controller 151 through address resolution control interface 275, requesting to examine whether or not this address is resolvable and resolve said address when said address is found resolvable (step 305 in FIG. 4).

Address resolution controller 151 judges, referring to address resolution logic which is provided as a proper function and the contents of address resolution control-use memory 201, that call incoming terminal address "123-4568" is resolvable; the consequence of this resolution is terminal 242; and the terminal controller corresponding to said terminal is terminal controller 122 of which service control unit 703 takes charges, then reporting the consequence of the address resolution to service controller 741.

Based on the report from address resolution controller 151, and using the RPC, service controller 741 requests execution of an inquiry processing whether the incoming call is connectable or not to terminal controller 122 corresponding to called terminal 242 (step 307 in FIG. 4).

Upon receiving this request, terminal controller 122 reads terminal control-use memory 172 and starts the acceptance control processing which is it's proper function, then by judging, based on the table provided therein, whether or not call originating terminal number "123-4567" is connectable technically, and reports the judged result together with the reason thereof to service controller 741.

When receiving the answer that the incoming call is acceptable from terminal controller 122, using the RPC, service controller 741 informs call originating-side terminal controller 121, via terminal control interface 271, of a call processing is under way in response to the acceptance of the call request, and using the RPC, requests called terminal side terminal controller 122, via terminal control interface 272, to starts a ringing processing step (308 in FIG. 4).

Terminal controller 121 requests subscriber circuit controller 211 to inform terminal 241 of the call processing being in progress while in response to this request, subscriber circuit controller 211 transmits dial tone to terminal 241, thereby informing that the call processing is under way. On the other hand, terminal controller 122 requests subscriber circuit controller device 212 to inform terminal 242 that there is a call incoming request, while in response to this request, subscriber circuit controller 212 rings the bell of terminal 242 informing the presence of said request.

Subsequently, through the RPC, service controller 741 instructs terminal controller 122, via terminal control interface 272, to wait until the speech path is ready to get through, and to report at the time when speech path is ready to get through (step 310 in FIG. 4). Terminal controller 122 starts a speech path standby control processing which is provided as a proper function, and instructs subscriber circuit controller 212 to monitor terminal 242 over the off-hook state.

When terminal 242 goes into the off-hook state, and receiving the state change via subscriber circuit controller 212 and terminal controller 122, service controller 741 then sets about a connection processing to couple terminals 241 and 242 together (step 311 in FIG. 4). To be more precise, in this embodiment, since subscriber circuit controllers 211 and 212 are connected respectively to separated switching controllers 222 and 224, unlike the case of said first embodiment, a straight decision as to which telecommunications apparatus is to undertake coupling terminals 241 and 242 together is not practicable, whereby the routing processing becomes significant.

Service controller 741 starts the routing processing which is provided as a proper function and receives the consequential information of practicability to connect terminals 241 and 242 each other by relaying switching controllers 222 and 224, using switching controller 223. Next, via the routine processing, the connection controllers 711~713 corresponding respectively to switching controllers 222~224 are identified; one of the group connection controllers is selected as a representative; and the information regarding other connection controllers is delivered to the representative connection controller which corresponds to the result of selection, and the representative connection controller is accepted as a coincidence with a routine processing consequence.

In this embodiment, it is assumed that connection controller 712 has been selected as a representative connection controller. Thus, in connection control-use memory 722 which connection controller 712 uses as a temporary storage, said connection controller 712 records the information re connection controllers 711 and 713 that correspond to other connection controllers making up a group of connection controllers represented by connection controller 712.

It is noted here that as regards the routing processing, this embodiment may be of such a configuration, wherein this routing processing is included in the connection controllers; in such a case, service controller 741 first generates an optional connection controller newly without undertaking routing calculations; showing terminal controllers 121~122 to said new connection controller as respective communication terminal points; rendering the connection controller executes the routing processing; becoming a representative connection controller; and putting connection controllers 711~723 under the control thereof. In this configuration, service controller 741 is allowed to operate with no respect of how many connection controllers are actually working.

Next, service controller 741 requests connection controller 712 to execute a processing of circuit-switching for regular voice transmission system, between terminals 241 and 242 under control respectively of terminal controllers 121 and 122. Connection controller 712 reads out from connection control-use memory 722 the information of connection controllers 711~713 which are derived as the related connection controllers by the routing processing. Then, connection controller 712 delivers the information respectively of the neighboring connection controllers and terminal controllers requesting to decide and execute the control procedures for each switching controller under their control through connection control interfaces by way of RPC.

Upon receiving the request from connection controller 712 through connection control interface 731, connection controller 711 inquires, how subscriber circuit controller 211 and switching controller 223 are coupled physically to switching controller 222, of terminal controller 121 and connection controller 712 by way of terminal control interface 271, RPC, and connection control interface 732, and then controls switching controller 222, following the answer to the inquiry and setting information of switching controller 222 stored in connection control-use memory 721.

Assuming in this embodiment that subscriber circuit controller 211, for example, is connected to the first port of switching controller 222 and switching controller 223 to the second port of thereof, connection controller 711 controls switching controller 222, via apparatus control interface 262, to couple the first and second port with each other.

Upon receiving the request from connection controller 712 via connection control interface 732, connection controller 712 inquires, how switching controller 222 is connected physically to switching controller 223, of connection controller 711 through the RPC and connection control interface 731, also inquires, how switching controller 224 is connected physically to switching controller 223, of connection controller 731 via the RPC and connection control interface 733, and then controls switching controller 223 according to the answer to the inquiries and the setting information of switching controller stored in connection control-use memory 722.

Assuming in this embodiment that switching controllers 222 and 224 for example are connected respectively to the second and third port of switching controller 223, connection controller 712 controls switching controller 223, via apparatus control interface 263, to connect the second and third port each other.

Upon receiving the request from connection controller 712 through connection control interface 733, connection controller 713 inquires, how subscriber circuit controller 212 and switching controller 223 are coupled physically to switching controller 224, of terminal controller 122 and connection controller 712 by way of terminal control interface 272, RPC, and connection control interface 732, and then controls switching controller 224, following the answer to the inquiry and the setting information of switching controller 224 stored in connection control-use memory 723.

Assuming in this embodiment that subscriber circuit controllers 212 and 223 for example are connected respectively to the fifth and second port of switching controller 224, connection controller 713 controls switching controller 224, via apparatus control interface 264, to couple the fifth and second port with each other.

Next, using the RPC, service controller 741 informs terminal controllers 121 and 122 respectively via terminal control interfaces 271 and 272 of speech path is ready for get through. Upon receiving the notice of the speech path is ready for get through, terminal controllers 121 and 122 inform respective subscriber circuit controllers 211 and 212 which are in charge of processing a necessary control for the speech path commissioning. In this embodiment, lighting of the busy indication lamp provided on each terminal corresponds to this noticing.

Figure 2:
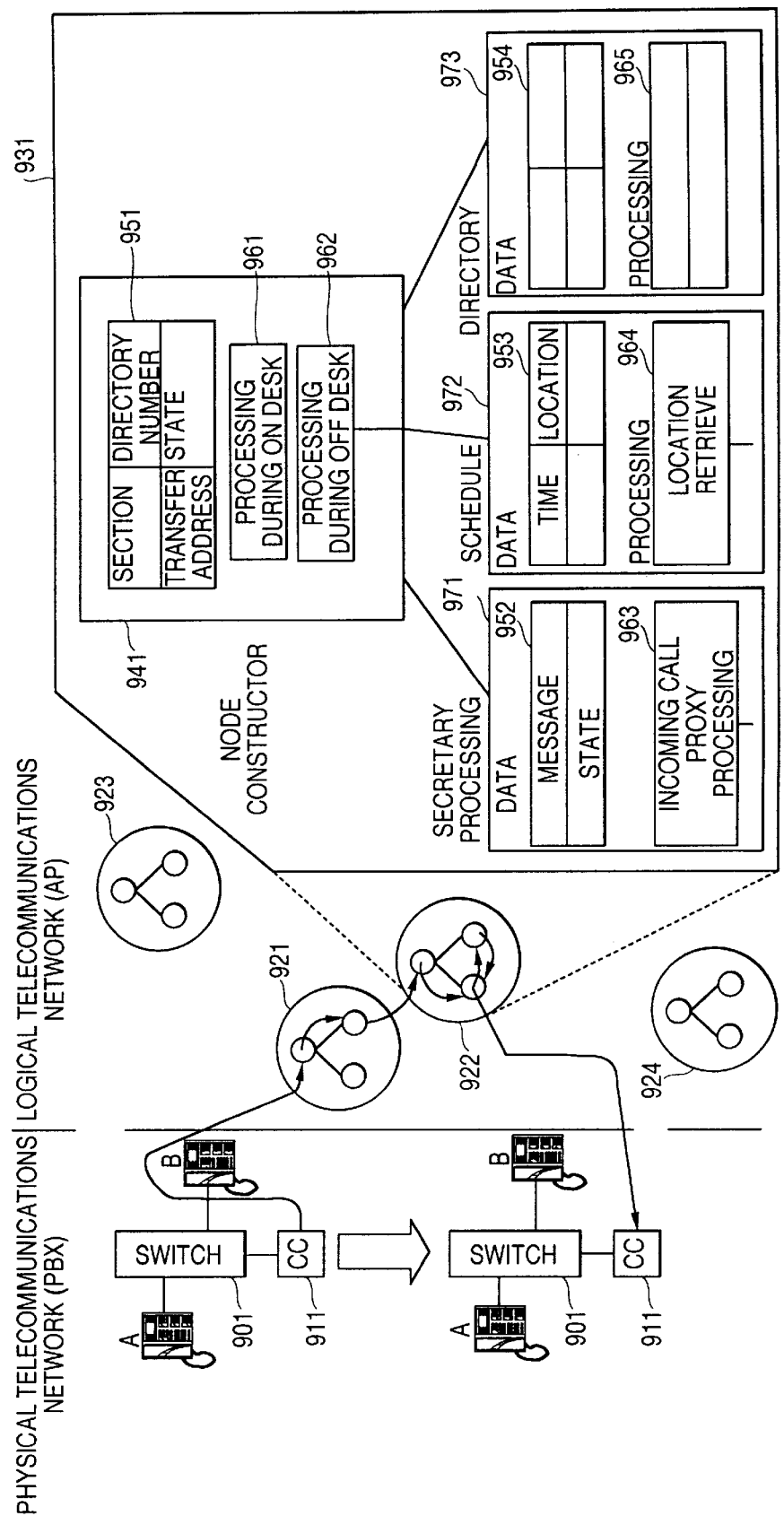
FIG. 2 is an illustrative figure presenting a configurational example of another conventional service control system.

Next, using the RPC, service controller 741 instructs terminal controllers 121 and 122 respectively via terminal control interfaces 271 and 272 to monitor the respective terminals concerned over their state change into the on-hook state, and obtains the information regarding the calling party from terminal controller 121 through the RPC and terminal control interface 271 to record the time of off-hook in service control-use memory 751 (step 312 in FIG. 2).

Next, supposing that terminal 241 has gone into the on-hook state, terminal controller 121 corresponding thereto detects this state change, reporting this information to service controller 741. Upon receiving this information, service controller 741 starts the service implementation termination processing (step 313). Then, service controller 741 advises terminal controllers 121 and 122 respectively via terminal control interfaces 271 and 272 to execute the service implementation termination processing, thereafter keeps waiting until when the report that terminal controllers 121 and 122 complete the service implementation termination processing.

Terminal controller 121 detects the state of subscriber circuit controller 211, wherein since the on-hook state is already detected, the terminal controller executes the service implementation termination processing to release terminal control-use memory 171 after re-initializing subscriber circuit controller 211, then informs service controller 741 about completion of the service implementation termination processing. Meanwhile, terminal controller 122 detects the state of subscriber circuit controller 212, finding the state without on-hook, instructs subscriber circuit controller 212, through apparatus control interface 261, to inform terminal 242 about completion of service implementation, thereafter keeping to wait until the subscriber circuit controller indicates the on-hook state. In response to this instruction, subscriber circuit controller 212 transmits a call cut-off tone to terminal 242, then keeps waiting until terminal 242 turns into the on-hook state.

Then, when terminal 242 turns to the on-hook state, subscriber circuit controller 212 also turns into the on-hook state, informing terminal controller 122 that the sate is changed into the on-hook state. In response to this notice, terminal controller 122 releases the condition of waiting, executing the service implementation termination processing for releasing terminal control-use memory 172, after re-initializing subscriber circuit controller 212, and informs service controller 741 about completion of the service implementation termination processing.

Upon receiving the notice about completion of the service implementation termination processing respectively from terminal controllers 121 and 122, service controller 741 releases the devices, namely operation sates of switching controllers 222 to 224 thus those are secured to during implement this service, subsequently executing the charge processing, following the calling party information stored in service control-use memory 751 and the time of service commencement, then writing the charge processing result in service control-use memory 751 and finally returning to the initial state.

Describing the effect and the result of the fourth embodiment of the present invention, it is said that in this embodiment, by rendering the RPC adaptable to the call from each of respective controllers, it becomes possible to minimize a change of each service controller aimed to undertake the service implementation processing across plural service controller units.

In the service common management/controller-applied conventional system, since controllers to control a plurality of devices are installed all together one buy one in said service common management/controller, free from complying with a certain rule, in case where the service controller arrangement or the arrangement of such telecommunications apparatus as a switching controller, etc. is changed, it used to be necessary to modify to execute calling up processing of RPC etc. and to review the contents of procedures of implementation of the service common management/controller.

In the fourth embodiment of the present invention, since encoding each controller which controls functions of telecommunications apparatus such as a switching controller etc. as a calling unit of the commonly usable function, resulting in that the timing of a RPC processing is definite and regular, thereby allowing availability of the effect and the result described above.

Further, in the fourth embodiment according to the present invention, in case where the routing processing is included in one connection controller, the connection controller which contains the routing processing is allowed to supervise other all connection controllers, whereby the service controller may behave as if functioning under one service control unit, thus resulting in availability of the unnecessariness to modify the service controller.

A further embodiment of the present invention is described hereunder. In said third embodiment, though the service controller is of such a configuration to call each control interface only via the service control library, the service controller is allowed to call each control interface in addition to calling the service control library, likewise in other embodiments. Further reversely to the above, in said first, second and fourth embodiment, it is practicable to utilize the service control library.

In the third embodiment, although a standard run is undertaken by letting service control library 511 takes charge of steps from 308 to 313, starting this run is feasible otherwise, not following the method in which the service controller calls the service control library. Namely, the service controller sets necessary information such as controller information denoting called terminal address to which the connection is to be made to each controller for telecommunications apparatus, instructing to start the standard execution for the controllers through control interface. Receiving the instruction from service controller, the controllers execute a judging control to judge how to call the standard control procedures defined in the service control library. Followed by calling the service control library according to the result of executing the judging control, the controllers execute the requested control according to the control procedures read out from the called service control library.

Further in this embodiment, it is practicable to reduce the amount of controller's procedures to be stored in the service controller by previously containing the method of calling the service control library in the controller of each telecommunications apparatus. Further, a similar method is applicable to such a controller which is merely a logical entity like an address resolution controller, etc. which does not take direct control on telecommunications apparatus. In this regard, a case where the address resolution controller requested to undertake an address resolution processing calls the service control library so as to control a terminal controller or a connection controller is a typical case.

Describing a practical embodiment hereunder, such a configuration is quoted, wherein in response to a request calling for the address resolution of terminal telephone number "999," the address resolution controller refers to the contents of an address resolution control-use memory owned thereby, and when the information relate plural terminal controllers and the information instructing to choose one which is not busy, the selection of a terminal controller which is not busy is executed by the way of calling service control library.

Also in the case of the fourth embodiment, to prevent the decline of an operation rate due to frequent application of the RPC, it is possible to attempt to reduce the subsequent communication quantity by the way of selecting one service control unit to actuate the service controller and choosing a representative connection controller. Enumerated below are the respective methods applicable for the selection and choice remarked above:

(a) a method to use a pre-selected rule
(b) a method to refer the load conditions of each service control unit as a basis of judgment.

Further, to accelerate speeds of a RPC processing, it is also allowed to provide proxy interfaces each of which represents control interface of other service control unit respectively within each service control unit and a processing which can not be managed by the proxy interface is only transferred to the proper control interface via RPC.

With reference to FIG. 8, although an inter-service control unit communication path is provided separately from the communication path via the switching controller, etc., the communication among the service control units may also be conducted through the communication path via switching controllers, etc.

Although in the present invention, each control interface and controller are generally handled as individual processing units, in view of the fact that they are closely related each other, a plurality of individual processing related together can also handled as an identical processing unit. The grouped processing unit will result in easiness in keeping consistency between each control interface and each controller when a new controller is developed or an existing controller is altered.

Further, in the embodiment of the present invention, although the processing of conversion—in the control interface—of an encoded identifier and a method of calling each of controller corresponding to every one of telecommunications apparatus, is implemented while service control is under way, previous computations for processing of conversion enables to increase the service implementation rate.

It is noted here that the program codes and the data for use in installing each controller of said telecommunications apparatus, address resolution controller, control interface, service controller, service control library, etc. can be stored in a recording medium, and executing these programs enables these controllers function as described above.

As described above, as regards the present invention, even when the telecommunications apparatus different from existing ones are controlled through the service control unit, a modification is required only on a control means in charge of the telecommunications apparatus concerned and its interface without altering other parts. This will result, according to the present invention, in practicability of reducing the amount of a change in the operating procedure stored in controllers in connecting new additional telecommunications apparatus to the service control unit.

As regards the present invention, the reason of this lies in feasibility to functionally define the service controller without affecting the method of implementing each controller of actual telecommunications apparatus by introducing a rule functionally defining the service controller, using a control interface of the telecommunications apparatus with its function encoded.

Further, as regards the present invention, even if such telecommunications apparatus with the method of operation different from that of existing telecommunications apparatus, are controlled through the service control unit, modification is required only for a group of interfaces corresponding respectively to a plurality of control means in charge of those different telecommunications devices concerned and other controllers are not required altering. This will result, according to the present invention, to reduce the amount of operating procedures to be stored in respective controller when those telecommunications apparatus having a different new method of operation are connected to the service controller.

In the present invention, the reason of this consists in availability of freedom from necessity to alter those function-encoded telecommunications apparatus control instructions, which the service controller applies, by appropriately dividing and installing a group of communication apparatus controllers and a group of control interfaces corresponding thereto.

Further as regards the present invention, it is possible that the task to enable the service control unit to control the telecommunications apparatus other than existing ones is achieved without compiling by the service controller while telecommunications service implementation is progressing.

The reason is that in the present invention, an adaptive processing at the time of calling a telecommunications apparatus controller from the service controller is executed along with communication service implementation.

Further as regards the present invention, the amount of a change in the operating procedure contained in the service controller is reduced comparing with a case applying the service controller defined for the conventional service common management/controller to the telecommunications apparatus other than existing ones.

The reason is that the present invention is available for provide the service control library having the same interface as that of the conventional service common management/control means, and practicability to define the service control library without affecting the method of implementing actual telecommunications apparatus control means by introducing a rule of defining the service control library, using the control interface of such a telecommunications apparatus with its function encoded.

Further as regards the present invention, the amount of alterations to the service controllers can be minimized in undertaking a service implementation processing across a plurality of service control units.

The reason is that in the present invention, the control means such as a switching controller, etc. since regarding its communicating function encoded as a function calling unit, the timing of a remote procedural call processing becomes definite and regular, and by letting one connection control means supervise all other connection control means, the service controller is allowed to behave as if functioning under one service control unit.

What is claimed is:

1. An apparatus that performs connection processing between terminals, comprising:

a first terminal that corresponds to a calling terminal;

a second terminal that corresponds to a called terminal;

a switching controller;

a first subscriber circuit controller that provides connectivity between the first terminal and the switching controller, the first subscriber circuit controller configured to monitor an operation state of the first terminal;

a second subscriber circuit controller that provides connectivity between the switching controller and the second terminal;

a media control device communicatively connected to the switching controller; and a service control unit communicatively connected to the first and second subscriber circuit controllers, the media control device, and the switching controller, wherein the service control unit comprises:

an apparatus control interface that provides an interface to said first and second subscriber circuit controllers, said media control device, and said switching controller;

a first terminal controller configured to receive a service start request outputted from the first terminal, the service start request being detected by said first subscriber circuit controller and forwarded to said first terminal controller via said apparatus control interface;

a terminal control memory that is communicatively connected to said first terminal controller, said first terminal controller storing information into said terminal control memory based on receiving the service start request;

a service controller that is actuated by said first terminal controller based on the service start request corresponding to a particular request, said service controller controlling said first terminal controller to read a call incoming terminal address, and in response to said call incoming terminal address, said first terminal controller reads out the call incoming terminal address from the information stored into said terminal control memory;

an address resolution controller that determines whether or not the call incoming terminal address is resolvable, wherein if the call incoming terminal address is not resolvable, call processing is terminated with respect to the service start request;

a second terminal controller configured to send a request to connect to the second terminal, via the second subscriber circuit controller and the apparatus control interface, and when the call incoming terminal address is resolvable, an answer to the request being sent back to the second terminal controller from the second terminal by way of the second subscriber circuit controller, wherein when the answer to the request corresponds to a refusal to connect, the call processing is terminated with respect to the service start request, wherein, when the second terminal controller receives an acceptance by the second terminal to connect, the service controller informs the first terminal controller that the call processing is continuing and informs the second terminal controller to start ringing the second terminal.

2. The apparatus according to claim 1, wherein the second terminal controller, after receiving the acceptance by the second terminal to connect, instructs the second subscriber circuit controller to monitor the second terminal for an off-hook state, and wherein the second terminal controller stays in a speech standby control state until the second terminal is detected as being in the off-hook state.

3. The apparatus according to claim 2, wherein, when the second terminal is detected as being in the off-hook state, the second terminal controller informs the service controller of the off-hook state, and wherein the service controller starts processing for communicatively connecting the first and second terminals with one another.

4. The apparatus according to claim 3, wherein, after the processing for communicatively connecting the first and second terminals has been completed, the service controller informs the first and second terminals, via the first and second terminal controllers, respectively, of a speech readiness state for start of communications between the first and second terminals.

5. A method for performing connection processing between first and second terminals that are respectively communicatively connected to first and second subscriber circuit controllers, the first and second subscriber circuit controllers being communicatively connected to each other via a switching controller, the method comprising:

monitoring, by the first subscriber circuit controller, an operation state of the first terminal;

detecting, by the first subscriber circuit controller, a service start request outputted from the first terminal, the service start request being detected by said first subscriber circuit controller and forwarded to a first terminal controller;

storing information into a terminal control memory based on receiving the service start request;

actuating a service controller by said first terminal controller when the service start request corresponds to a particular request;

reading a call incoming terminal address from said terminal control memory by said first terminal controller, under control of said service controller;

in response to said call incoming terminal address, said first terminal controller reading out the call incoming terminal address from the information stored into said terminal control memory;

determining whether or not the call incoming terminal address is resolvable, wherein if the call incoming terminal address is not resolvable, call processing is terminated with respect to the service start request;

sending, by way of a second terminal controller, a request to connect to the second terminal, via the second subscriber circuit controller, when the call incoming terminal address is resolvable;

receiving an answer to the request, the answer being sent back to the second terminal controller from the second terminal by way of the second subscriber circuit controller;

when the answer to the request corresponds to a refusal to connect, terminating the call processing with respect to the service start request; and when the second terminal controller receives an acceptance by the second terminal to connect, informing the first terminal controller that the call processing is continuing and informs the second terminal controller to start ringing the second terminal.

6. The method according to claim 5, further comprising:

after receiving the acceptance by the second terminal to connect, the second terminal controller instructing the second subscriber circuit controller to monitor the second terminal for an off-hook state, wherein the second terminal controller stays in a speech standby control state until the second terminal is detected as being in the off-hook state.

7. The method according to claim 6, wherein, when the second terminal is detected as being in the off-hook state, the second terminal controller informs the service controller of the off-hook state, and wherein the service controller starts processing for communicatively connecting the first and second terminals with one another.

8. The method according to claim 7, further comprising:

after the processing for communicatively connecting the first and second terminals has been completed, informing the first and second terminals, via the first and second terminal controllers, respectively, of a speech readiness state for start of communications between the first and second terminals.

9. A method for performing connection processing, by way of a service control unit, between first and second terminals that are respectively communicatively connected to first and second subscriber circuit controllers, the first and second subscriber circuit controllers being communicatively connected to each other via a switching controller, the method comprising:

storing, within the service control unit, information concerning the first and second terminals, the information being provided by the first and second terminal by way of the first and second subscriber circuit controllers, respectively;

receiving, by a first terminal controller of the service control unit by way of the first subscriber circuit controller, a service start request from the first terminal, the service start request requesting a call connection to the second terminal;

obtaining, by the first terminal controller, information concerning the second terminal that was previously stored during the storing step;

determining operational steps that are to be taken based on the service start request and the information concerning the second terminal that was obtained during the obtaining step;

determining whether or not a terminal address of the second terminal obtained during the obtaining step is resolvable;

if the terminal address is not resolvable, terminating any further call processing operations;

if the terminal address is resolvable, creating an inquiry to the second terminal, by way of a second terminal controller of the service control unit, the inquiry being made to determine if an incoming call is acceptable to the second terminal;

if receiving from the second terminal an indication that the incoming call is determined to be unacceptable, terminating any further call processing operations;

if the incoming call is determined to be acceptable, informing the first terminal controller of the acceptable determination, wherein the first terminal controller informs the first terminal that a call processing is in progress while at a same time starting a ringing processing to the second terminal is performed under control of the second terminal controller.

10. The method according to claim 9, further comprising:

informing the first and second terminals by way of the first and second terminal controllers of a readiness of a speech communications between the first and second terminals.

* * * * *